United States Patent
Ishihara et al.

(10) Patent No.: US 8,122,039 B2
(45) Date of Patent: Feb. 21, 2012

(54) APPARATUS FOR MULTIMEDIA INTEGRATED RETRIEVAL AND STORAGE MEDIUM STORING A MULTIMEDIA INTEGRATED RETRIEVAL PROGRAM

(75) Inventors: Masaki Ishihara, Kawasaki (JP); Takayuki Baba, Kawasaki (JP); Susumu Endo, Kawasaki (JP); Shuichi Shiitani, Kawasaki (JP); Yusuke Uehara, Minato (JP); Daiki Masumoto, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 189 days.

(21) Appl. No.: 12/729,980

(22) Filed: Mar. 23, 2010

(65) Prior Publication Data
US 2010/0250569 A1    Sep. 30, 2010

(30) Foreign Application Priority Data
Mar. 26, 2009  (JP) .................................. 2009-077437

(51) Int. Cl.
*G06F 7/00* (2006.01)
(52) U.S. Cl. ........................................ 707/758; 707/802
(58) Field of Classification Search .................. 707/758, 707/802, 803, 809, 829, 999.1, 999.102; 715/202
See application file for complete search history.

(56) References Cited

U.S. PATENT DOCUMENTS

| | | | | |
|---|---|---|---|---|
| 6,128,649 A | * | 10/2000 | Smith et al. ................. | 709/217 |
| 7,836,110 B1 | * | 11/2010 | Schoenbach et al. ......... | 707/829 |
| 7,941,739 B1 | * | 5/2011 | Mohammed et al. .......... | 715/202 |
| 2002/0103919 A1 | * | 8/2002 | Hannaway ..................... | 709/231 |
| 2006/0242550 A1 | * | 10/2006 | Rahman et al. ............. | 715/500.1 |
| 2009/0030926 A1 | * | 1/2009 | Aharoni et al. ............... | 707/102 |

FOREIGN PATENT DOCUMENTS

| | | |
|---|---|---|
| JP | 6-301733 A | 10/1994 |
| JP | 7-105070 A | 4/1995 |

OTHER PUBLICATIONS

Anselm, Spoerri "Visual search editor for composing meta searches", 67th Annual Meeting of the American Society for Information Science and Technology, Nov. 18, 2004.
Degi, Y. et al., "A graphical filter/flow representation of boolean queries: A prototype implementation and evaluation", Journal of the American Society for Information Science, Feb. 1993, p. 327-339.
Hansaki, Tomoyuki et al., "Visual Search Interface for Constructing Queries While Confirming Results", 19th Annual Conference of the Japanese Society for Artificial Intelligence, Jun. 17, 2005.

(Continued)

*Primary Examiner* — Hung T Vy
(74) *Attorney, Agent, or Firm* — Fujitsu Patent Center

(57) ABSTRACT

A multimedia integrated retrieval apparatus includes a feature value extracting unit calculating a feature value of single media data; a media information storage unit storing the feature value and storing composite media data in association with the single media data; a retrieval processing unit identifying other pieces of single media data corresponding to the single media data; a retrieval controlling unit, generating structural body data that includes a first node indicative of the single media data, a second node indicative of the another piece of single media data, a first link connecting the first node to the second node, a third node indicative of another composite media data, and a second link connecting the third node to the second node, if the another piece of composite media data including the another piece of single media data is present; and a display unit displaying the structural body data.

12 Claims, 30 Drawing Sheets

OTHER PUBLICATIONS

Kazuhisa, Oono et al.,"A Music Retrieval Method Based on Tendencies of Feature Value throughout A Music", Journal of the Database Society of Japan (DBSJ), vol. 7, No. 1 Jun. 2008, p. 233-238.

Kouji, Komatsu "Use of Language Processing Technique in Information Retrieval System", Keiei Ronsyu, vol. 13, No. 1 Dec. 2003, p. 105-114.

Peter, Eades "A Heuristic for Graph Drawing", Congressus Numerantium, vol. 42 //1984, p. 149-160.

Takemochi, Ishii "Video Retrieval Technique—Increasing Need thereof and Technical Innovation", Techno Current, No. 419 Jun. 1, 2006.

* cited by examiner

FIG.2
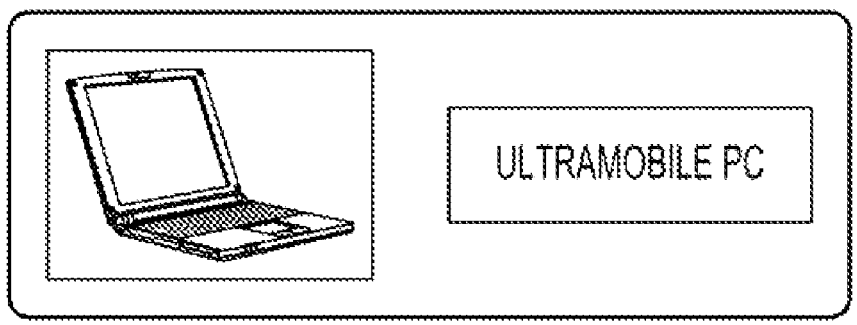
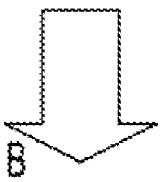
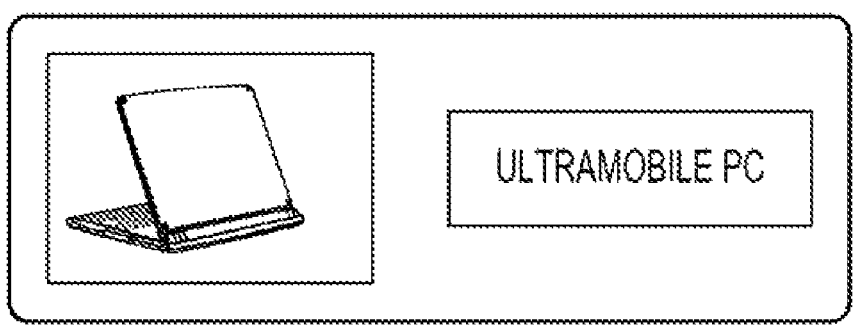
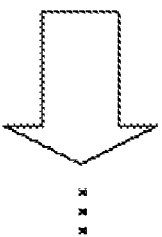

APPARATUS FOR MULTIMEDIA INTEGRATED RETRIEVAL AND STORAGE MEDIUM STORING A MULTIMEDIA INTEGRATED RETRIEVAL PROGRAM

CROSS-REFERENCE TO RELATED APPLICATIONS

This application is based upon and claims the benefit of priority of the prior Japanese Patent Application No. 2009-77437, filed on Mar. 26, 2009, the entire contents of which are incorporated herein by reference.

FIELD

The present invention relates to techniques for assisting users in multimedia retrieval.

BACKGROUND

Known multimedia retrieval techniques include a document retrieval technique for retrieving a document with a keyword serving as a search condition, a similar image retrieval technique for retrieving a similar image with an image serving as a search condition, and a music retrieval technique for retrieving music with humming serving as a search condition. These techniques are disclosed in the paper entitled "Use of Language Processing Technique in Information Retrieval System" contributed by Kouji KOMATSU, Keiei Ronsyu, pp. 105-114, Vol. 13, No. 1, December 2003, the paper "Video Retrieval Technique—Increasing Need thereof and Technical Innovation" authored by Takemochi ISHII, Techno Current, No. 419, Jun. 1, 2006, and the paper entitled "A Music Retrieval Method Based on Tendencies of Feature Value throughout A Music," authored by Kazuhisa OONO, Yu SUZUKI, and Kyoji KAWAGOE, Journal of the Database Society of Japan (DBSJ), Vol. 7, No. 1, pp. 233-238, 2008.

The known multimedia retrieval techniques typically allow a media of the same type as the one input as a search condition to be retrieved. In this specification, the media collectively refer to text, image, music, etc. Any one of the media including one type of medium is referred to as single media, and any one of the media including two or more types of media is referred to as composite media. For example, a moving image including an image and music, a document including a text and an image, and a Web page including a text and an image are all referred to as composite media. Multimedia includes single media and composite media.

Methods of retrieving diverse media such as image, music, moving image with a keyword serving as a search condition are contemplated today. Retrieval of the diverse media is also referred to as cross-media retrieval. For example, a computer performing a cross-media retrieval receives a keyword input as a search condition, and extracts any Web page including the keyword through a full-text search. The cross-media retrieval computer then outputs, as the retrieval results, the extracted Web pages. The cross-media retrieval functions on the premise that images and text included on the same Web pages have similar meaning with a high probability. For example, Japanese Unexamined Patent Application Publication No. 7-105070 discloses a cross-media retrieval technique based on that premise.

In a typical retrieval process, a searcher may analyze retrieval results, perform a retrieval operation with a new search condition, and analyze retrieval results again. The searcher repeats the retrieval operation until the target information is obtained. For example, in the multimedia retrieval process, the searcher repeats the retrieval operation using an image included in the Web page resulting from the previous search operation as a search condition. In this case, the searcher downloads the image to be used as a search condition from the Web page, temporarily stores the image on the computer, and then inputs (i.e., uploads) the downloaded image as a new search condition. A history of search conditions may be managed and displayed if the number of retrieval cycles reaches a predetermined number. Such a technique is disclosed in Japanese Unexamined Patent Application Publication No. 6-301733; Degi Young and Ben Shneiderman, "A graphical filter/flow representation of Boolean queries: A prototype implementation and evaluation," Journal of the American Society for Information Science, Vol. 44(6), pp. 327-339, 1993; Tomoyuki HANSAKI, Buntarou SHIZUKI, Kazuo MISUE, Jiro TANAKA, "Visual Search Interface for Constructing Queries while Confirming Results," The $19^{th}$ Annual Conference of the Japanese Society for Artificial Intelligence, 2005; and Anselm Spoerri, "Visual search editor for composing meta searches," Proceedings of the 67th Annual Meeting of the American Society for Information Science and Technology, 2004.

SUMMARY

According to an aspect of the invention, a multimedia integrated retrieval apparatus includes a data gathering unit gathering a plurality of pieces of media data through a network; a feature value extracting unit calculating a feature value of single media data representing a type of media among the plurality of pieces of media data gathered by the data gathering unit; a media information storage unit storing the feature value in association with the single media data, and storing composite media data representing a plurality of types of media among the plurality of pieces of media data in association with the single media data included in the composite media data; a retrieval processing unit referencing the media information storage unit, and identifying other pieces of single media data corresponding to the single media data using the feature value of the single media data based on a retrieval instruction; a retrieval controlling unit receiving the retrieval instruction to retrieve the single media data from a user, generating first structural body data that includes a first node indicative of the single media data, a second node indicative of the another piece of single media data, and a first link connecting the first node to the second node, referencing the media information storage unit to determine whether another piece of composite media data including the another piece of single media data is present, and composite media generating second structural body data that includes, with the first structural body data, a third node indicative of another composite media data, and a second link connecting the third node to the second node, if the another piece of composite media data is present; and a display unit displaying the second structural body data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a history of search conditions.

DESCRIPTION OF EMBODIMENTS

If a retrieval operation is repeated, a searcher may wish to widen a past search condition. The searcher may set a next search condition reviewing the past retrieval results. The search condition and the retrieval results are appropriately presented to the searcher. For example, the searcher may become confused about what search condition and retrieval results have been obtained for an image set as a search condition in the middle of the search operation. The searcher may fail to recognize a chain of search steps including the search condition and the retrieval results.

The inventor of this invention has developed a technique that allows a searcher to easily grasp the flow of retrieval in a multimedia retrieval process.

Figure 1:
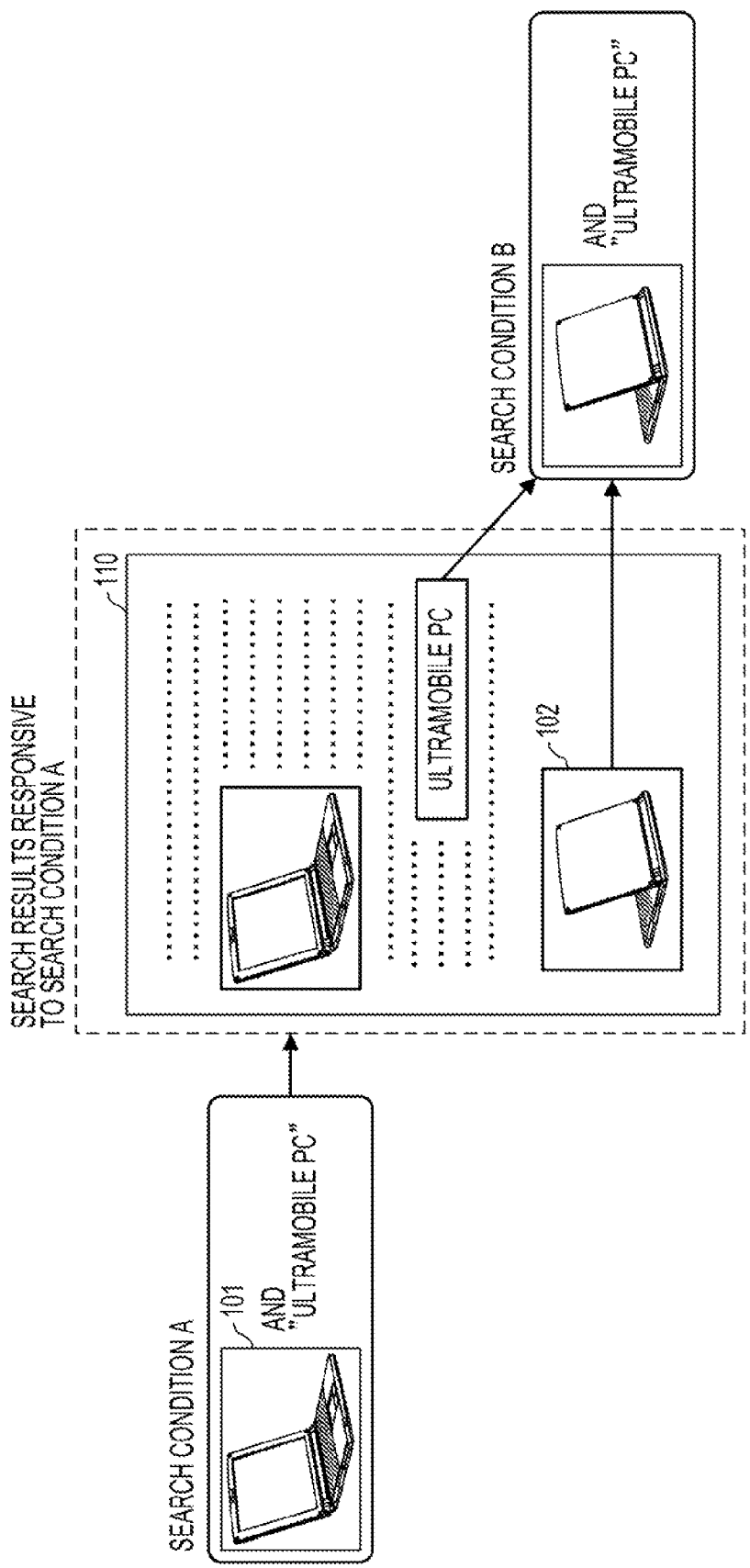
FIG. 1 illustrates a multimedia retrieval process.

Referring to FIG. 1 through FIGS. 4A-4C, embodiments of the technique are described below. FIG. 1 illustrates a multimedia retrieval process. As illustrated in FIG. 1, a user as a searcher operates a personal computer (PC), and inputs a search condition A (e.g., image 101 and a keyword "ultramobile PC" in FIG. 1) to execute a retrieval process. The user checks a Web page 110 obtained as a result of the retrieval process. The user downloads an image 102, and then stores temporarily the image 102 on the PC. The user then inputs the image 102 and the keyword "ultramobile PC" as a search condition B, and executes the retrieval process again. The user repeats the retrieval process until the desired information is reached.

The user may wish to widen the past search condition by returning to one of the past search points. To satisfy such a desire, a history of search conditions may be visualized as in the related art illustrated in FIG. 2. During the repetition of retrieval operations, the user may forget the origin of the image 102 contained in a search condition B, in this case, the Web page 110. The user thus forgets why the search condition A has been updated to be the search condition B. A mere history of the search conditions may not be sufficient for the user to grasp the chain of retrieval steps.

In accordance with the embodiment, structural bodies illustrated in FIGS. 3 and 4A-4C are displayed on a display of the PC operated by the user. In accordance with the embodiment, the origin of single media serving as a search condition is made to be recognizable so that the user may grasp the flow of retrieval steps.

Figure 3:
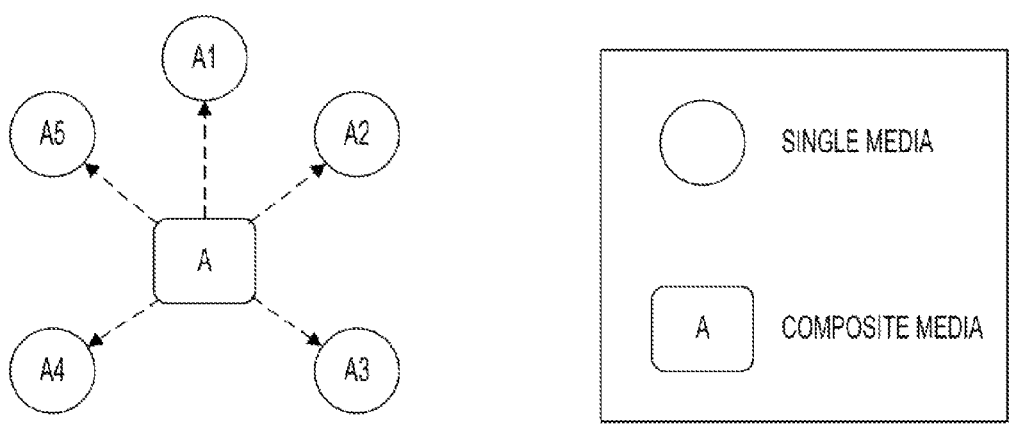
FIG. 3 diagrammatically illustrates an embodiment.

FIG. 3 illustrates an example of an inclusion relationship between composite media and single media included in the composite media. Referring to FIG. 3, a node A is composite media A, and nodes A1 through A5 are single media A1 through A5, respectively. Also in FIG. 3, arrow-headed broken lines illustrate the inclusion relationship where the composite media A includes the single media A1 through A5. In accordance with the present embodiment, the structural body is displayed based on a spring model as will be described in detail later. The spring model may be generated based on related art.

For example, one technique is disclosed in Peter Eades, "A Heuristic for Graph Drawing," Congressus Numerantium, Vol. 42, pp. 149-160, 1984. Such a technique may be used to generate the spring model.

Figure 4A:
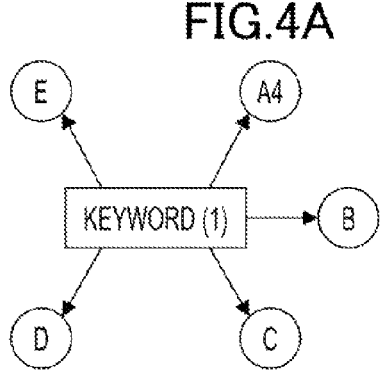
FIGS. 4A-4C illustrate a retrieval concept of the embodiment.

FIG. 4A illustrates a screen example in which the retrieval operation is performed with a keyword (1) serving as a search condition. Each arrow-headed solid line represents a correspondence relationship between a search condition and search results in FIGS. 4A-4C. Referring to FIG. 4A, the search results of the keyword (1) are single media A4, single media B, single media C, single media D, and single media E.

Figure 4B:
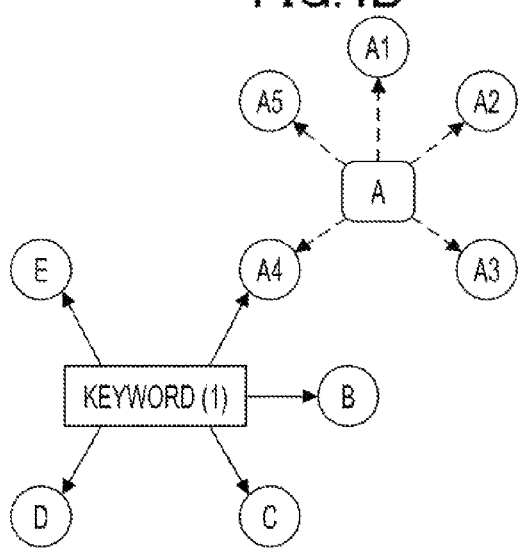

An operation to be discussed later causes the screen illustrated in FIG. 4A to be replaced with the screen illustrated in FIG. 4B, in which the composite media A including the single media A4 is displayed. Referring to FIG. 4B, the single media A1, the single media A2, the single media A3, and the single media A5 included in the composite media A are further displayed.

Figure 4C:
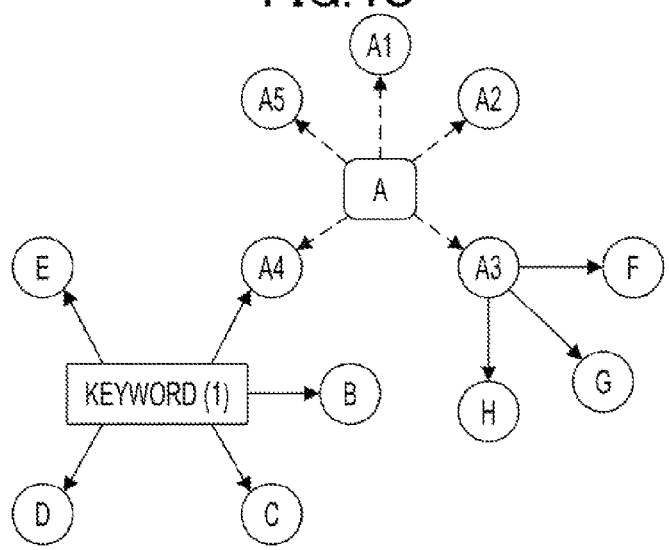

The screen illustrated in FIG. 4B is replaced with a screen illustrated in FIG. 4C, in which the retrieval operation is performed again with the single media A3 serving as a search condition. Referring to FIG. 4C, single media F, single media G, and single media H are retrieval results with respect to the single media A3. For example, if a structural body illustrated in FIG. 4C is displayed to the user, the user may easily learn that the single media A3 originates from the composite media A. In other words, the user may easily recognize the flow of the search. The process of a multimedia integrated retrieval apparatus 3 as one embodiment of the technique is described below.

Figure 5:
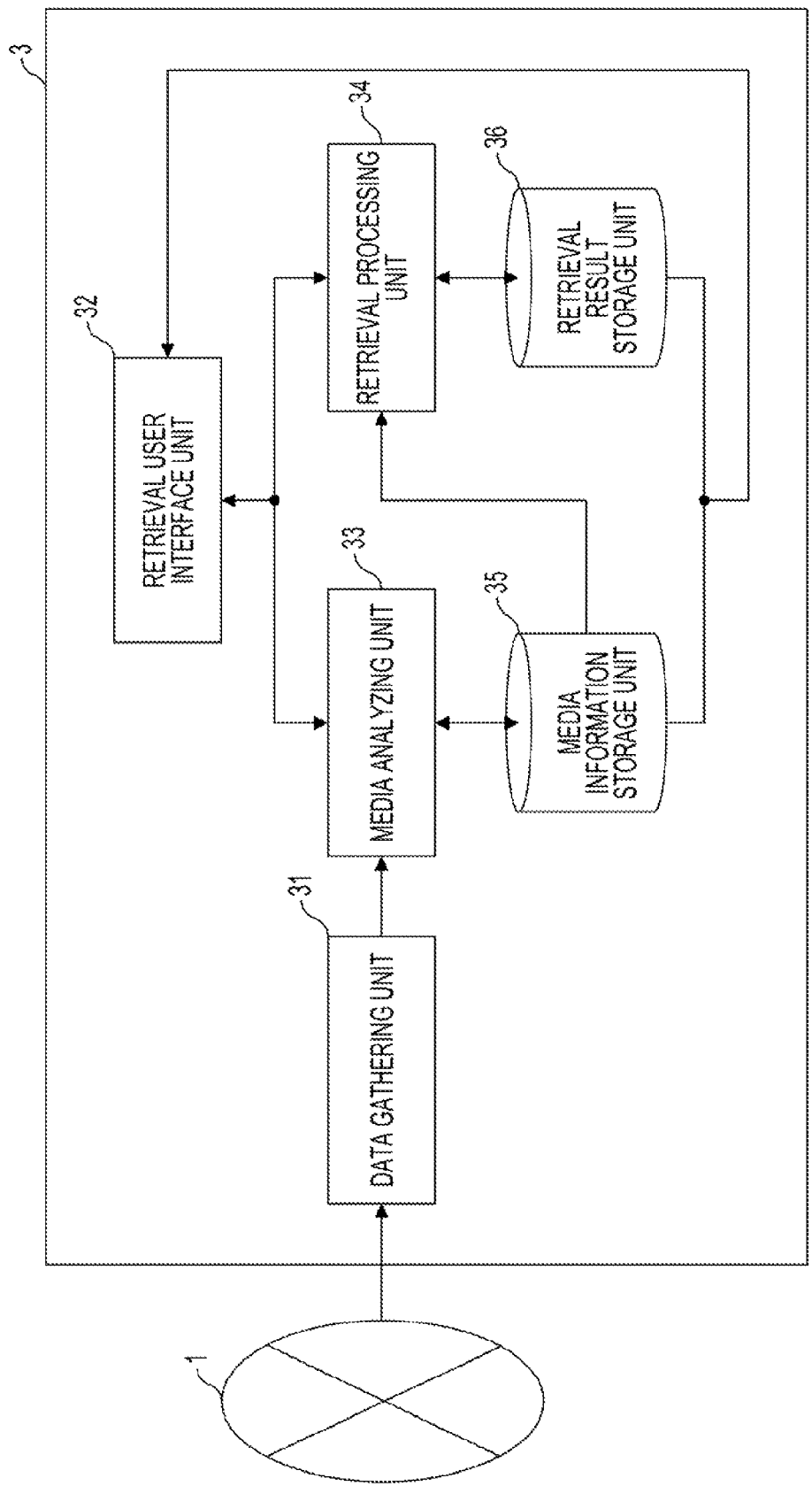
FIG. 5 is a functional block diagram of a multimedia integrated retrieval apparatus.

FIG. 5 is a functional block diagram of the multimedia integrated retrieval apparatus 3 as one embodiment of the technique. The multimedia integrated retrieval apparatus 3 includes a data gathering unit 31, a retrieval user interface unit 32, a media analyzing unit 33, a retrieval processing unit 34, a media information storage unit 35, and a retrieval result storage unit 36. The data gathering unit 31 gathers media data via a network 1, e.g., the Internet, and outputs the gathered media data to the media analyzing unit 33. The retrieval user interface unit 32 receives, from a user, media data serving as a search condition or a specific instruction. The retrieval user interface unit 32 then outputs the media data to the media analyzing unit 33 and outputs a retrieval instruction to the retrieval processing unit 34. The retrieval user interface unit 32 further performs a process to display the above-described structural body to the user, based on data stored on the media information storage unit 35 and the retrieval result storage unit 36. Upon receiving the media data from one of the data gathering unit 31 and the retrieval user interface unit 32, the media analyzing unit 33 performs a media analysis process to be discussed later. The media analyzing unit 33 stores process results onto the media information storage unit 35. Upon receiving the retrieval instruction from the retrieval user interface unit 32, the retrieval processing unit 34 performs the retrieval process based on the data stored on the media information storage unit 35. The retrieval processing unit 34 stores the retrieval results onto the retrieval result storage unit 36.

Figure 6:
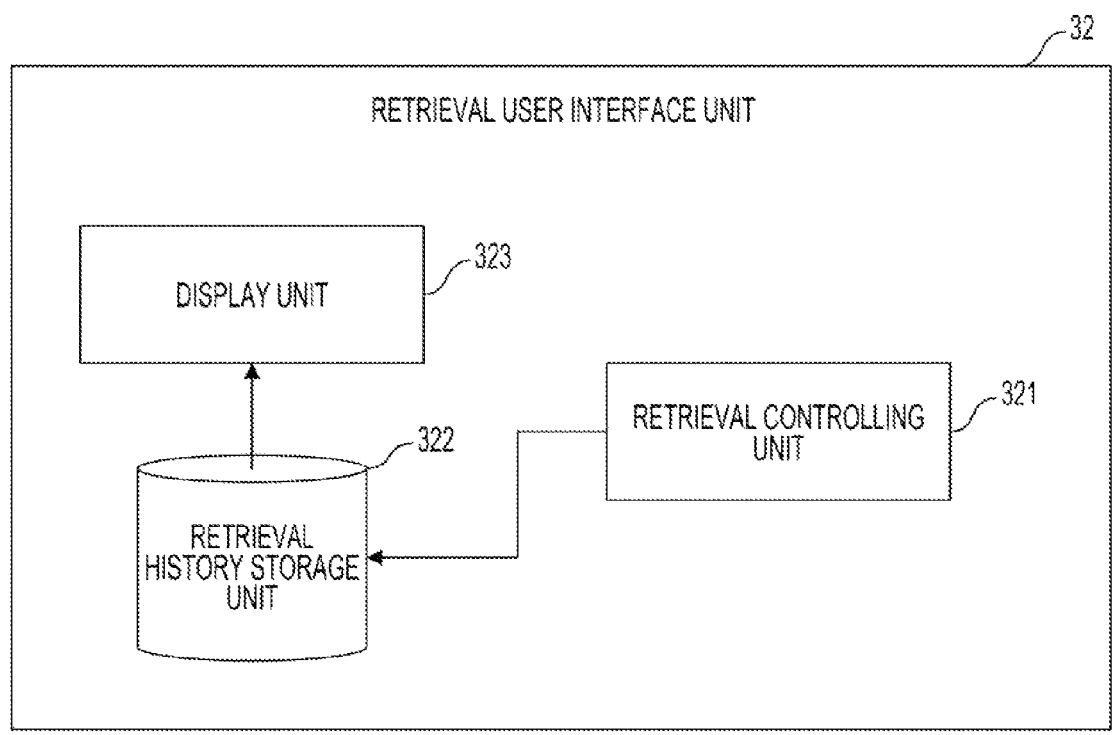
FIG. 6 is a function block diagram of a retrieval user interface unit.

As illustrated in FIG. 6, the retrieval user interface unit 32 includes a retrieval controlling unit 321, a retrieval history storage unit 322, and a display unit 323. The retrieval controlling unit 321 receives a search condition or a specific instruction from the user. Also, the retrieval controlling unit 321 generates data of the above-described structural body and stores the generated data onto the retrieval history storage unit 322, based on the data stored on the media information storage unit 35 and the retrieval result storage unit 36. Using the data of the structural body stored on the retrieval history storage unit 322, the display unit 323 generates display data of the structural body and then displays the display data to the user.

Figure 7:
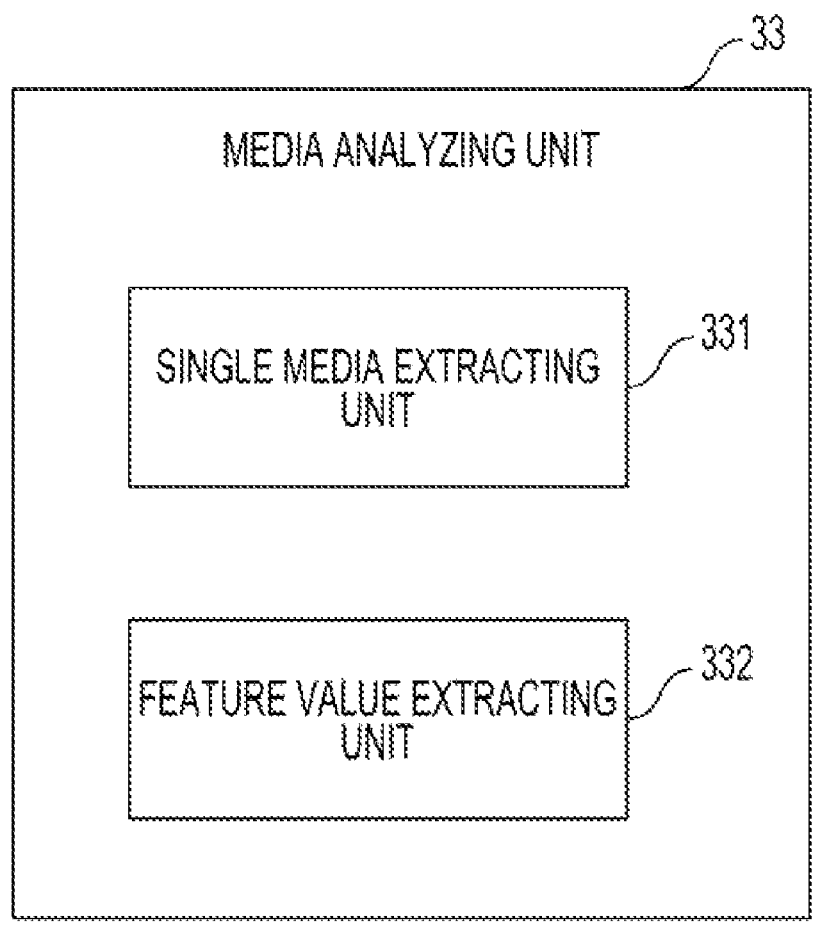
FIG. 7 is a function block diagram of a media analyzing unit.

As illustrated in FIG. 7, the media analyzing unit 33 includes a single media extracting unit 331 and a feature value extracting unit 332. The single media extracting unit 331 extracts single media from composite media, and stores the extracted single media onto the media information storage unit 35. The feature value extracting unit 332 calculates, for each piece of single media, a single media feature value of the single media stored on the media information storage unit 35. The feature value extracting unit 332 stores the feature value in association with the single media onto the media information storage unit 35.

Figure 8:
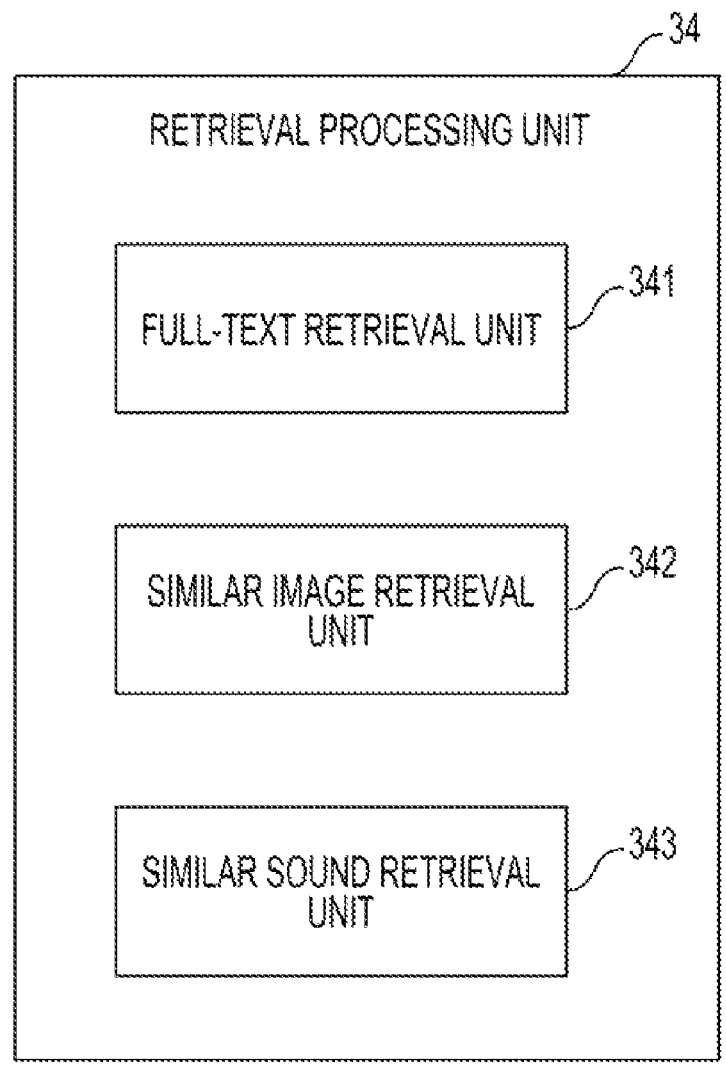
FIG. 8 is a function block diagram of a retrieval processing unit.

As illustrated in FIG. 8, the retrieval processing unit 34 includes a full-text retrieval unit 341, a similar image retrieval unit 342, and a similar sound retrieval unit 343. If a keyword or a text is input as a search condition, the full-text retrieval unit 341 performs a full-text retrieval process based on the data stored on the media information storage unit 35. The full-text retrieval unit 341 stores the retrieval results onto the retrieval result storage unit 36. If an image is input as a search condition, the similar image retrieval unit 342 performs a similar image retrieval process based on the data stored on the media information storage unit 35. The similar image retrieval unit 342 then stores the retrieval results onto the retrieval result storage unit 36. If humming or a sound is input as a search condition, the similar sound retrieval unit 343 performs a similar sound retrieval process based on the data stored on the media information storage unit 35. The similar sound retrieval unit 343 then stores the retrieval results onto the retrieval result storage unit 36.

Figure 9A:
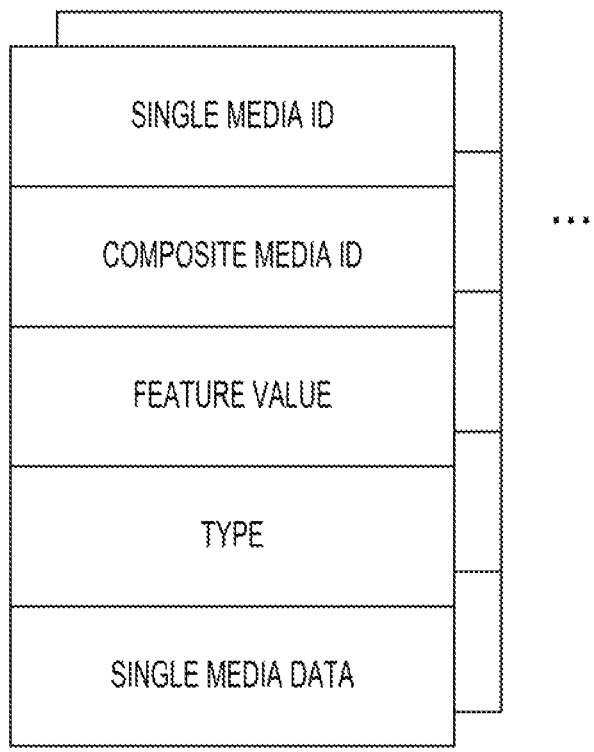
FIGS. 9A AND 9B illustrate an example of data stored on a media information storage unit.
Figure 9B:
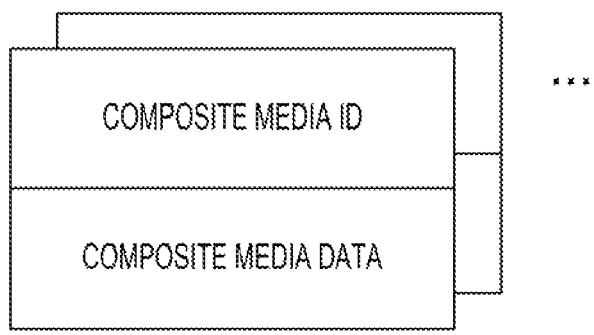

FIGS. 9A and 9B illustrate an example of data stored on the media information storage unit 35. Referring to FIG. 9A, the media information storage unit 35 stores, for each piece of single media, a single media identification (ID) of a piece of single media, a composite media ID of a piece of composite media including the single media, a feature value of the single media, a type of the single media (text, image, sound), and single media data. If there is no composite media including the single media, data indicating that no including composite media is present is set. Referring to FIG. 9B, the media information storage unit 35 further stores, for each piece of composite media, a composite media ID of the composite media and the composite media data.

Figure 10:
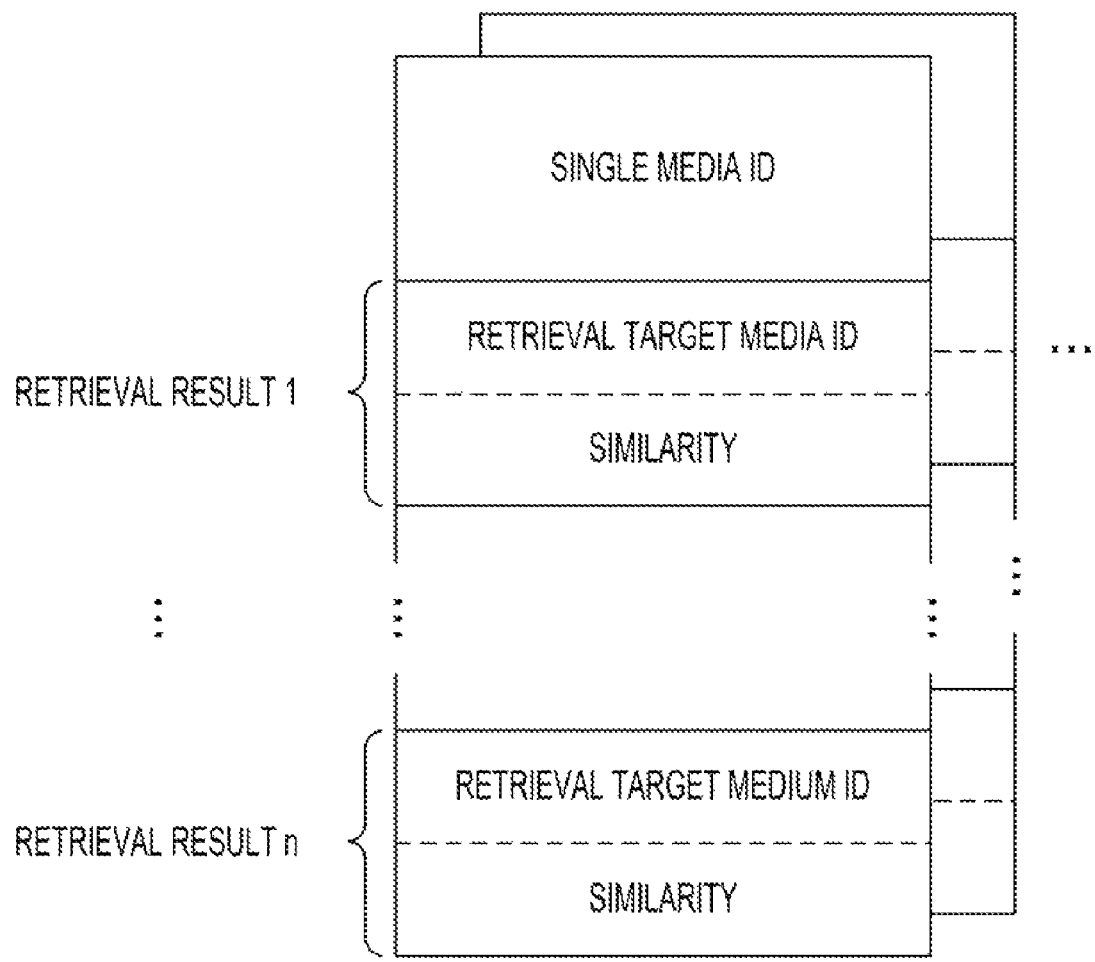
FIG. 10 illustrates an example of data stored on the media information storage unit.
Figure 11:
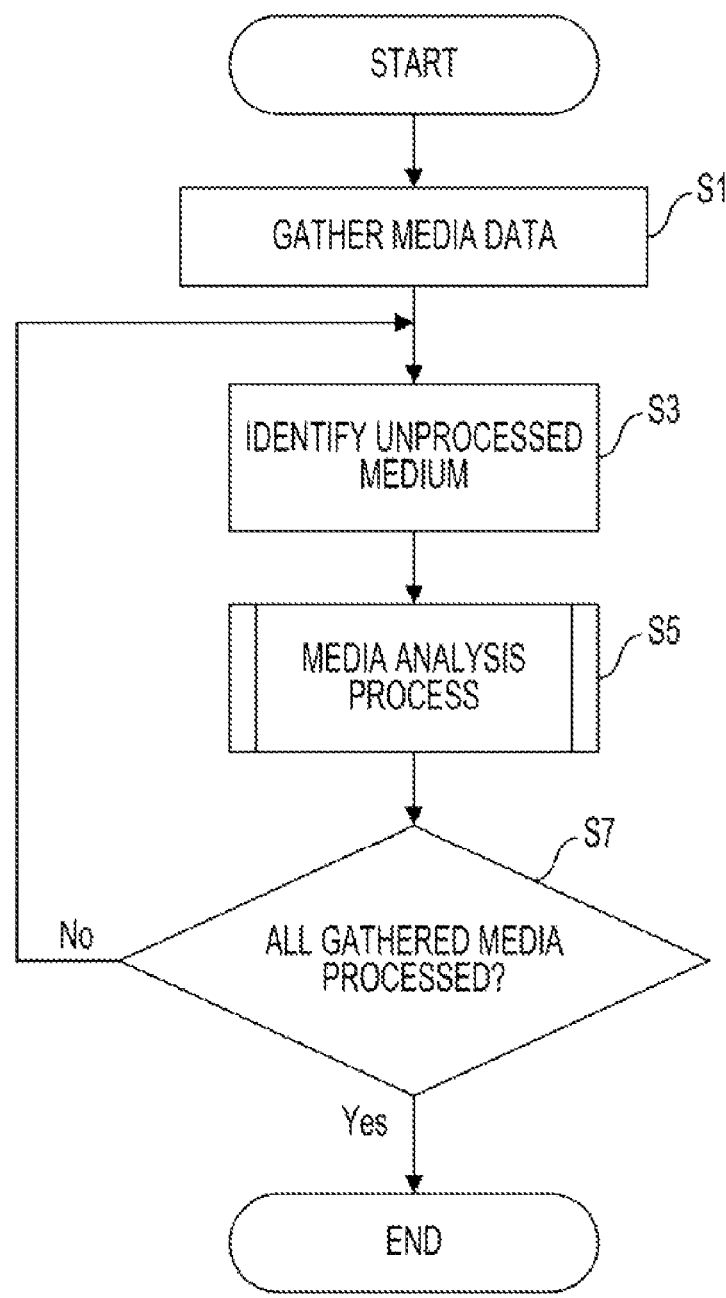
FIG. 11 is a flowchart of a pre-process of the multimedia retrieval.

FIG. 10 illustrates an example of data stored on the retrieval result storage unit 36. Referring to FIG. 10, the retrieval result storage unit 36 stores, for each piece of single media serving as a search condition, a single media ID of the piece of single media, a retrieval result 1, . . . , retrieval result n. Each of the retrieval results includes a retrieval target media ID and a similarity. A single media ID of a piece of single media of a retrieval target as a retrieval result corresponding to a search condition is set in the retrieval target media ID. The similarity refers to a similarity value between the single media serving as the search condition and the single media serving as the retrieval target.

The process of the multimedia integrated retrieval apparatus 3 is described below with reference to FIGS. 11 through 19. The multimedia integrated retrieval apparatus 3 performs a multimedia retrieval pre-process illustrated in FIG. 11. The data gathering unit 31 gathers the media data via the network 1 and outputs the gathered media data to the media analyzing unit 33 (step S1 in FIG. 11). Upon receiving the media data from the data gathering unit 31, the media analyzing unit 33 identifies unprocessed media (step S3). The media analyzing unit 33 performs a media analysis process on the identified media (step S5). The media analysis process is described later. The media analyzing unit 33 determines whether or not all the gathered media has been processed (step S7). If it is determined that not all the gathered media has been processed (NO in step S7), processing returns to step S3. If it is determined that all the gathered media has been processed (YES in step S7), processing ends.

Figure 12:
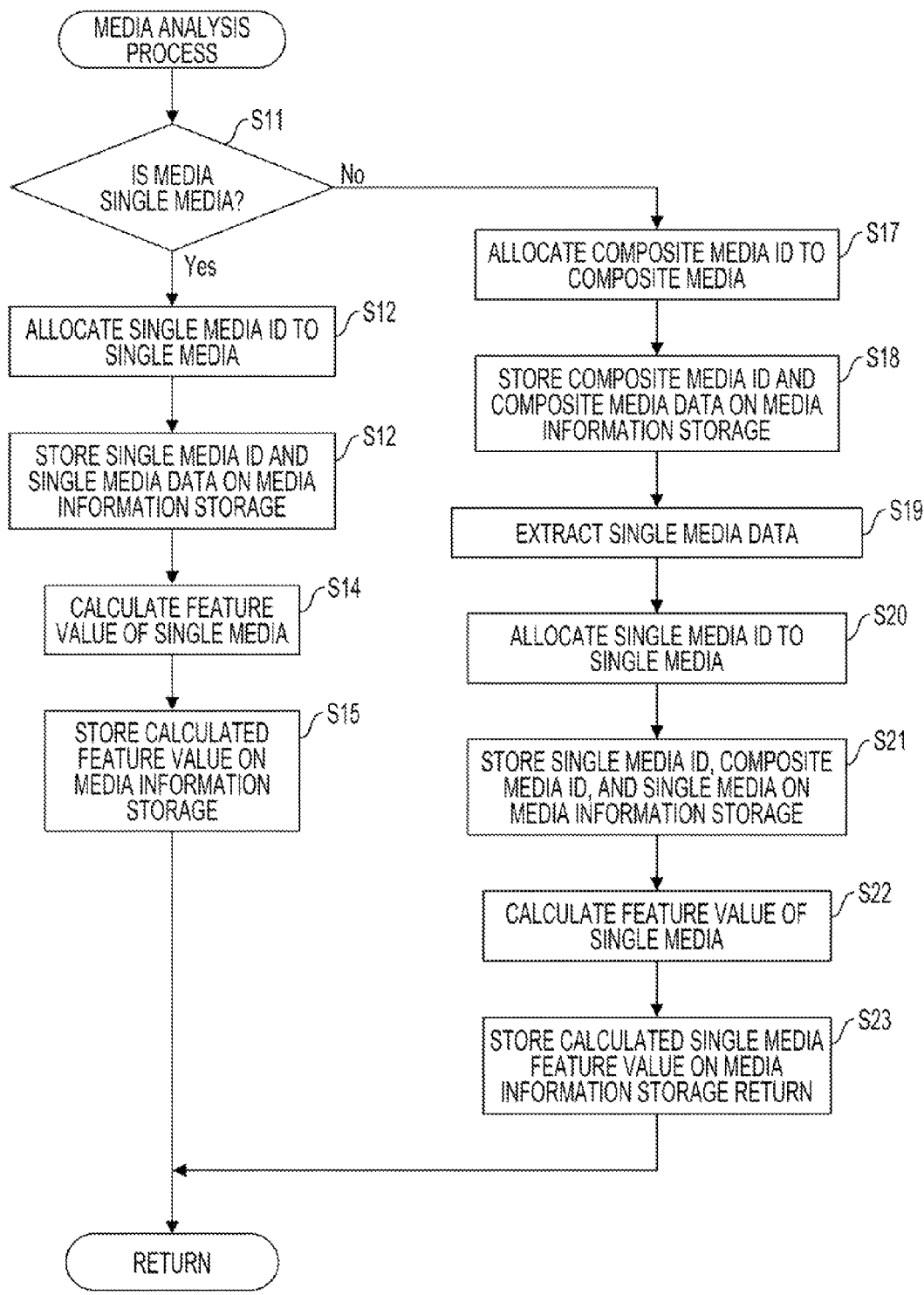
FIG. 12 is a flowchart of a media analysis process.

The media analysis process is described with reference to FIG. 12. FIG. 12 is a flowchart of the media analysis process. The single media extracting unit 331 in the media analyzing unit 33 determines whether or not the identified media is single media (step S11 in FIG. 12). If it is determined that the identified media is single media (YES in step S11), the single media extracting unit 331 allocates a single media ID to each piece of the single media (step S12). The single media extracting unit 331 stores the single media ID and the data of the single media onto the media information storage unit 35 (step S13). If the identified media is single media, the single media extracting unit 331 stores, on the media information storage unit 35, data indicating that no composite media is present.

The feature value extracting unit 332 calculates a feature value of the single media from the single media data stored on the media information storage unit 35 (step S14). The feature value extracting unit 332 stores, onto the media information storage unit 35, the calculated feature value in association with the single media (step S15). If the single media is a text, the feature value extracting unit 332 performs a morphological analysis process, thereby decomposing the text into index terms. The feature value extracting unit 332 weights the terms through a term frequency-inverse document frequency (TF-IDF) process, thereby resulting in a feature value. Any known technique of calculating the feature value of the text may be used. For example, the technique disclosed in the paper entitled "Use of Language Processing Technique in Information Retrieval System" may be used.

If the single media is an image, a visual feature value such as color or shape may be extracted. Any known technique of calculating the feature value of the image may be used. For example, the technique disclosed in the paper "Video Retrieval Technique—Increasing Need thereof and Technical Innovation" may be used. Any known technique of calculating the feature value of the sound may be used. For example, the technique disclosed in the paper entitled "A Music Retrieval Method Based on Tendencies of Feature Value throughout A Music." Subsequent to step S15, the media analysis process ends. Processing returns to step S7 in FIG. 11.

If it is determined that the identified media is not single media (NO in step S11), the single media extracting unit 331 allocates a composite media ID to the media (step S17). The single media extracting unit 331 stores, onto the media information storage unit 35, the composite media ID of the composite media and the data of the composite media (step S18). The single media extracting unit 331 extracts single media data from the composite media (step S19). In this case, the single media extracting unit 331 decomposes the composite media into single media units. In the case of a Web page, the single media extracting unit 331 decomposes the Web page in accordance with, for example, hyper text markup language (HTML) tags. In the case of a document, the single media extracting unit 331 decomposes the text into a text portion and an image portion for extraction. The document is hierarchically managed according to the text portion and the image portion. In the case of a video, the single media extracting unit 331 performs a known cut detection process and extracts a representative frame image.

The single media extracting unit 331 allocates single media IDs respectively to each of the extracted pieces of single media (step S20). The single media extracting unit 331 stores, onto the media information storage unit 35, the single media ID and the single media data in association with each other (step S21).

The feature value extracting unit 332 calculates the feature value of the single media for each piece of single media data stored on the media information storage unit 35 (step S22). The feature value extracting unit 332 stores, onto the media information storage unit 35, the calculated feature value in association with the single media data (step S23). The calculation process of the feature value of the single media is identical to the operation in step S14. The media analysis process thus ends, and processing returns to step S7 in FIG. 11.

Through the process in steps S17 to S23, the single media extracting unit 331 stores, onto the media information storage unit 35, the single media extracted from the composite media. The multimedia integrated retrieval apparatus 3 may thus visualize the inclusion relationship between the composite media and the single media as illustrated in FIG. 3.

Figure 13A:
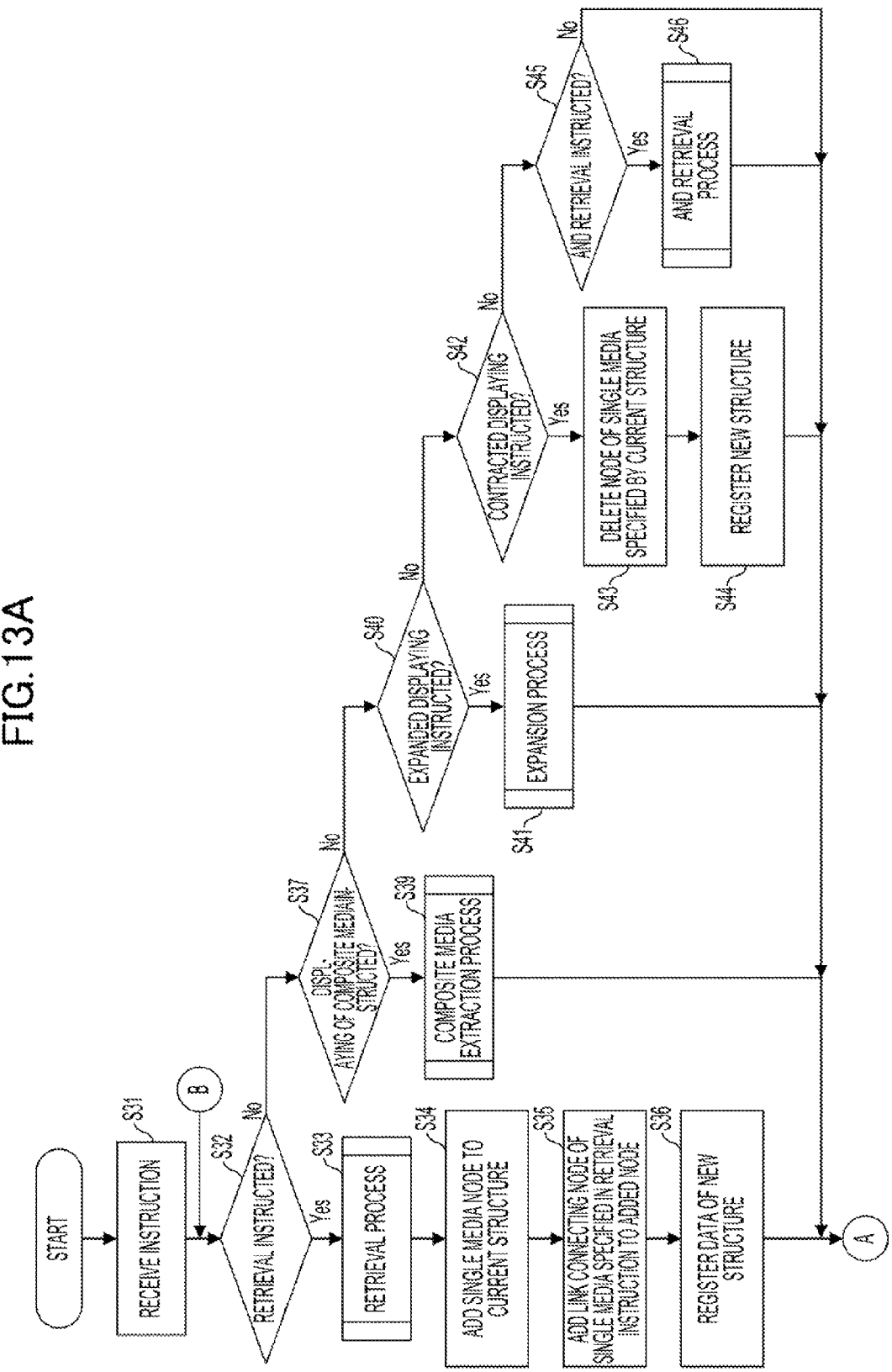
FIG. 13A is a flowchart of a multimedia integrated retrieval process.
Figure 13B:
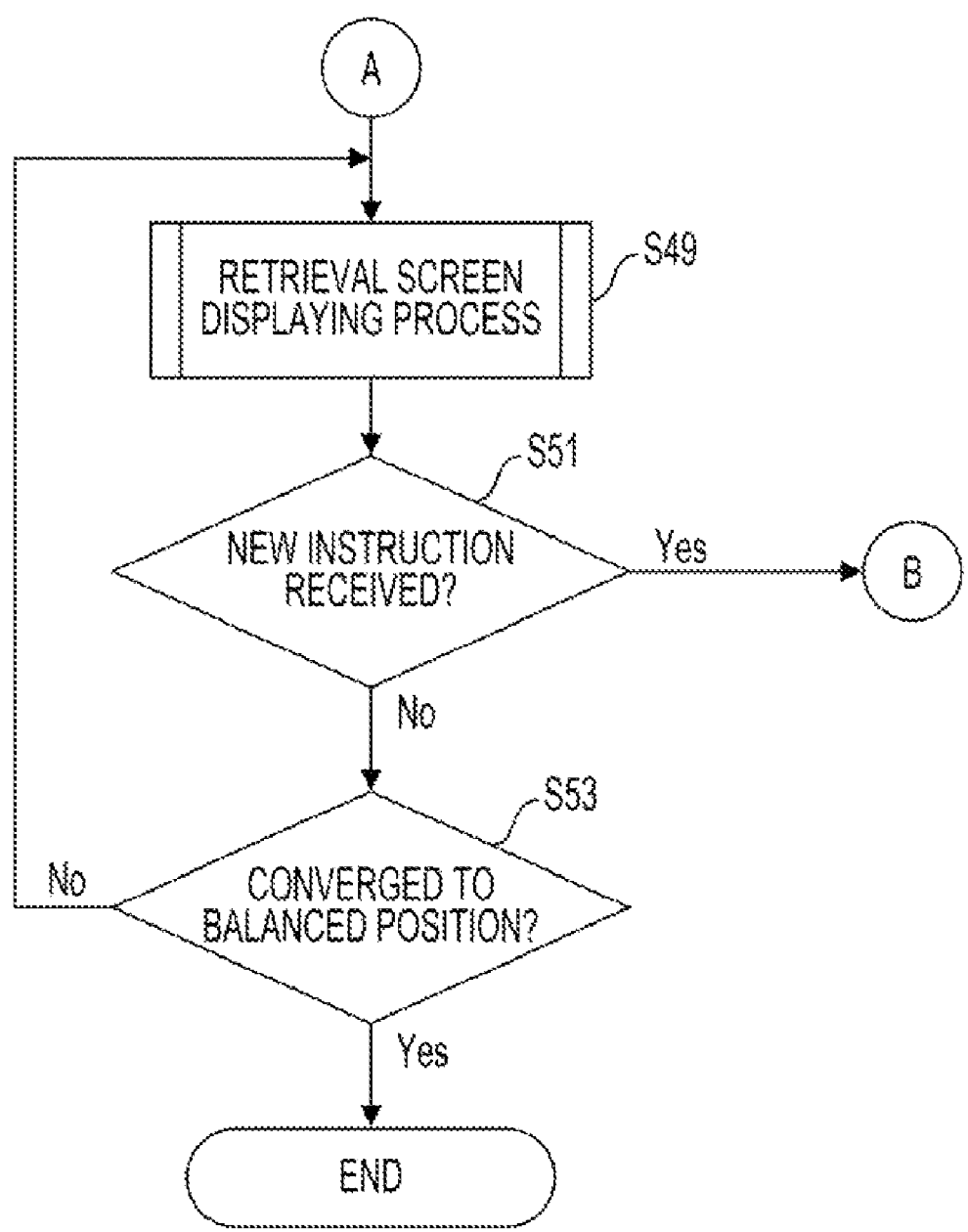
FIG. 13B is a continuation of the flowchart of FIG. 13A.
Figure 14:
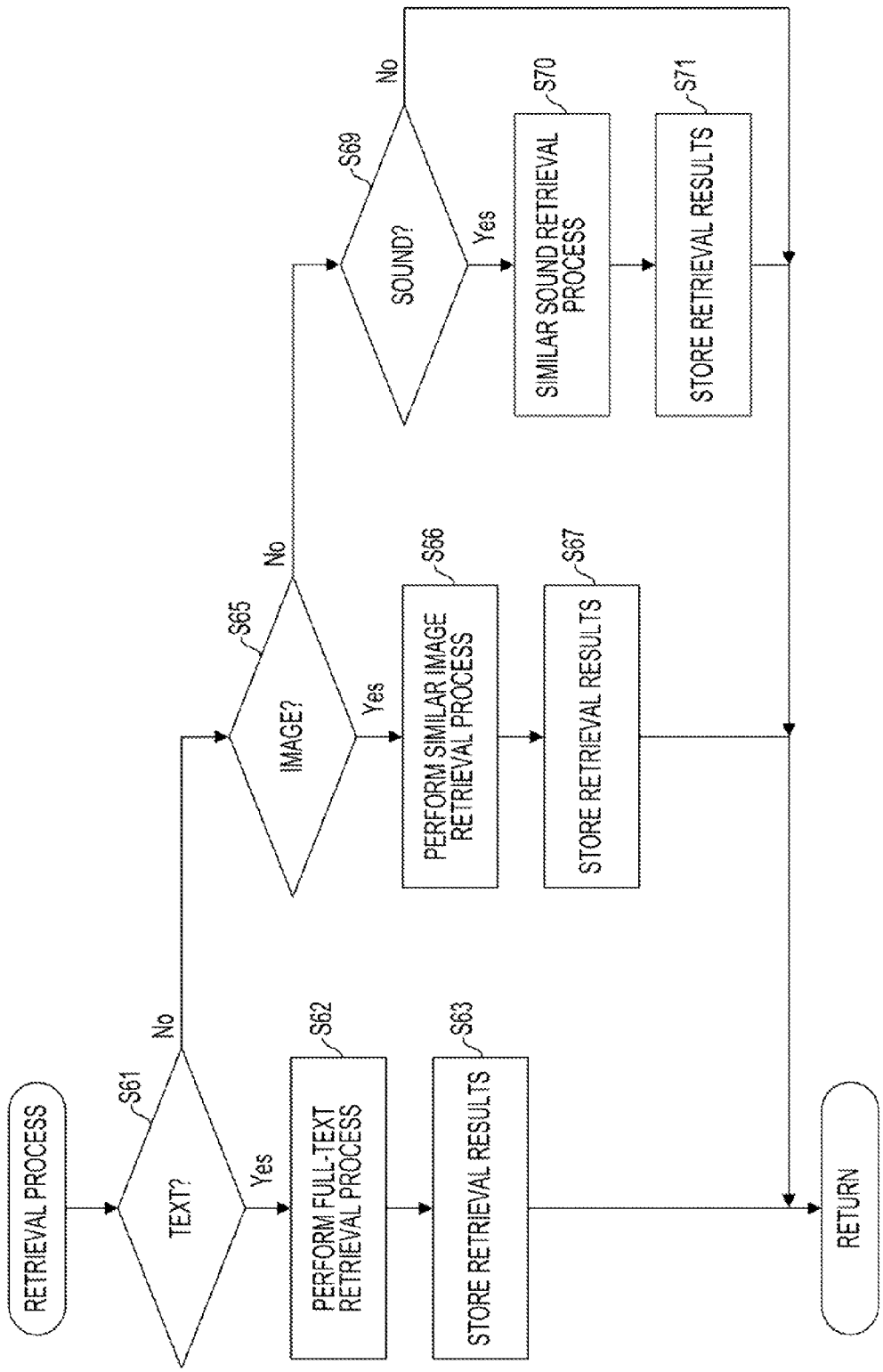
FIG. 14 is a flowchart of a retrieval process.

As illustrated in FIGS. 13A and 13B, a multimedia integrated retrieval process of the embodiment is described. The user operates the multimedia integrated retrieval apparatus 3, thereby inputting a piece of single media serving as a search condition on a retrieval screen (not illustrated) displayed on the display unit 323. Operating a keyboard, the user enters a keyword. Operating a mouse, the user drags and drops the single media data (such as an image file or a sound file) stored in a specific folder.

Operating the mouse and/or the keyboard, the user enters, as appropriate, a retrieval instruction, a composite media display instruction, an expansion display instruction, a contraction display instruction, and/or an AND retrieval instruction. For example, the user enters the retrieval instruction by left-clicking on a node of the single media serving as a search condition on a retrieval screen. The retrieval instruction includes an ID of a selected piece of single media. The user enters the composite media display instruction, for example, by right-clicking on the retrieval screen for a node of the single media to be displayed. The composite media display instruction includes the single media ID of the selected piece of single media. The user enters the expansion display instruction, for example, by left-clicking on a node of the composite media to be displayed on the retrieval screen. The expansion display instruction includes an ID of the selected piece of composite media. The user enters the contraction display instruction, for example, by right-clicking on a node of the single media to be folded on the retrieval screen. The contraction display instruction includes an ID of the selected piece of single media. The user enters the AND retrieval instruction on the retrieval screen, for example, by dragging nodes of the single media to be AND retrieved closer to each other. The AND retrieval instruction includes an ID of the pieces of single media to be AND retrieved.

The retrieval controlling unit 321 in the retrieval user interface unit 32 receives an instruction from the user (step S31 in FIG. 13A). The retrieval user interface unit 32 determines whether or not the received instruction is a retrieval instruction (step S32). If the received instruction is a retrieval instruction (YES in step S32), the retrieval controlling unit 321 outputs the single media ID included in the retrieval instruction to the retrieval processing unit 34. Upon receiving the single media ID from the retrieval controlling unit 321, the retrieval processing unit 34 performs the retrieval process on the data stored on the media information storage unit 35 (step S33).

When the retrieval process is complete, information regarding the single media extracted in the retrieval process is transferred from the retrieval processing unit 34 to the retrieval controlling unit 321. The retrieval controlling unit 321 receives the information regarding the single media from the retrieval processing unit 34.

The retrieval controlling unit 321 adds a node of the single media extracted through the retrieval process to the structural body stored on the retrieval history storage unit 322 (step S34). The retrieval controlling unit 321 adds, to the structural body, a link connecting the node of the piece of single media having the single media ID included in the retrieval instruction to the node added in step S34 (step S35). The new structural body thus generated is registered on the retrieval history storage unit 322 (step S36).

Processing proceeds to step S49 (FIG. 13B) via the entry point A.

If no retrieval instruction has been received (NO in step S32), the retrieval controlling unit 321 determines whether or not the received instruction is the composite media display instruction (step S37). If the received instruction is the composite media display instruction (YES in step S37), the retrieval controlling unit 321 performs a composite media extraction process based on the data stored on the media information storage unit 35 (step S39). The composite media extraction process includes extracting composite media if the composite media includes a piece of single media specified in the composite media display instruction. The composite media extraction process also includes adding the node of the extracted composite media to the current structural body and registering the data of the new structural body on the retrieval history storage unit 322. The composite media extraction process is described in detail later. Processing proceeds to step S49 (FIG. 13B) via the entry point A.

If the received instruction is not a composite media display instruction (NO in step S37), the retrieval controlling unit 321 determines whether the received instruction is an expansion display instruction (step S40). If the received instruction is an expansion display instruction (YES in step S40), the retrieval controlling unit 321 performs an expansion process based on the data stored on the media information storage unit 35 (step S41). The expansion process includes extracting single media included in the composite media specified in the expansion display instruction. The expansion process further includes adding, to the current structural body, the node of the extracted single media and registering the data of the new structural body onto the retrieval history storage unit 322. This process is described in detail later. Processing proceeds to step S49 (FIG. 13B) via the entry point A.

If the received instruction is not an expansion display instruction (NO in step S40), the retrieval controlling unit 321 determines whether or not the received instruction is a contraction display instruction (step S42). If the received instruction is a contraction display instruction (YES in step S42), the retrieval controlling unit 321 deletes the node of the single media specified in the contraction display instruction (step S43). The retrieval controlling unit 321 then registers, on the retrieval history storage unit 322, the data of the structural body subsequent to the deletion operation as data of a new structural body (step S44). Processing proceeds to step S49 (FIG. 13B) via the entry point A.

If the received instruction is not a contraction display instruction (NO in step S42), the retrieval controlling unit 321 determines whether the received instruction is an AND retrieval instruction (step S45). If the received instruction is an AND retrieval instruction (YES in step S45), the retrieval controlling unit 321 performs an AND retrieval process based on the data stored on the media information storage unit 35 and the retrieval history storage unit 322 (step S46). The AND retrieval process includes extracting common composite media if the common composite media is present as described later. The AND retrieval process also includes adding the extracted common composite media to the current structural body and registering the data of the new structural body onto the retrieval history storage unit 322. The process is described in detail later. Processing proceeds to step S49 (FIG. 13B) via the entry point A.

If the received instruction is not an AND retrieval instruction (NO in step S45), processing proceeds to step S49 (FIG. 13B) via the entry point A.

Entering through the entry point A in FIG. 13B, the display unit 323 in the retrieval user interface unit 32 performs a retrieval screen display process based on the data stored on the retrieval history storage unit 322 (step S49 in FIG. 13B). The retrieval screen display process includes generating structural display data in accordance with the spring model, and displaying the structural display data to the user. The process is described in detail later.

The retrieval controlling unit 32 determines whether a new instruction has been received from the user (step S51). If a new instruction has been received (YES in step S51), processing returns to step S32 via the entry point B.

If no new instruction has been received NO in step S51), the display unit 323 determines whether or not the position of each node of the currently displayed structural body has converged to a balanced position (step S53). The balanced position is described in detail later. If the position of each node of the currently displayed structural body has converged to a balanced position (YES in step S53), the process ends.

If it is determined that the position of each node of the currently displayed structural body has not converged to a balanced position NO in step S53), processing returns to step S49. In other words, step S49 is repeated until it is determined that the position of each node of the currently displayed structural body has converged to a balanced position.

Through the above-described process, the user advances the retrieval process by entering repeatedly the retrieval instruction, the composite media display instruction, the expansion display instruction, and the AND retrieval instruction. By viewing the structural body, the user may easily grasp the flow of retrieval process. Since the single media included in the composite media is displayed in response to the expansion display instruction, the user may easily specify a next search condition.

The retrieval process in step S33 (FIG. 13A) is described below with reference to FIG. 14A. The retrieval processing unit 34 searches the media information storage unit 35 based on the single media ID received from the retrieval controlling unit 321. The retrieval processing unit 34 retrieves, from the media information storage unit 35, information regarding the single media specified as the search condition.

The retrieval processing unit 34 determines whether or not the retrieved single media is a text (step S61). If the retrieved single media is a text (YES in step S61), the retrieval processing unit 34 outputs, to the full-text retrieval unit 341, a full-text retrieval instruction with the information of the single media serving as a search condition. Upon receiving the full-text retrieval instruction from the retrieval processing unit 34, the full-text retrieval unit 341 performs a full-text retrieval process based on the information of the single media included in the full-text retrieval instruction (step S62). The full-text retrieval unit 341 stores the retrieval results onto the retrieval result storage unit 36 (step S63). More specifically, the full-text retrieval unit 341 extracts, from the media information storage unit 35, a single media text similar to the single media text serving as the search condition, based on the feature value of the single media serving as the search condition. The full-text retrieval unit 341 stores, on the retrieval result storage unit 36, the retrieval results including the single media ID and similarity thereof for each piece of single media. The full-text retrieval unit 341 extracts a single media text having a similarity value with the single media text serving as the search condition higher than a specific threshold value, or if the single media is sorted in similarity order, the full-text retrieval unit 341 extracts single media higher than a specific rank from the top. The process then ends.

If it is determined that the single media specified as the search condition is not a text (NO in step S61), the retrieval processing unit 34 determines whether or not the single media is an image (step S65). If the single media is an image (YES in step S65), the retrieval processing unit 34 outputs, to the similar image retrieval unit 342, a similar image retrieval instruction with information regarding the single media serving as a search condition. Upon receiving the similar image retrieval instruction from the retrieval processing unit 34, the similar image retrieval unit 342 performs a similar image retrieval process based on the information of the single media included in the similar image retrieval instruction (step S66). The similar image retrieval unit 342 stores the retrieval results onto the retrieval result storage unit 36 (step S67). More specifically, the similar image retrieval unit 342 extracts, from the media information storage unit 35, a single media image similar to the single media image serving as the search condition based on the feature value of the single media image serving as the search condition. The similar image retrieval unit 342 stores, onto the retrieval result storage unit 36, the retrieval results including the single media ID and similarity thereof for each piece of single media. The similar image retrieval unit 342 extracts a single media image having a similarity value with the single media image serving as the search condition higher than a specific threshold value, or if the pieces of single media are sorted in similarity order, the similar image retrieval unit 342 extracts a single media image higher than a specific rank from the top. The process then ends.

If it is determined that the single media specified as the search condition is not an image (NO in step 65), the retrieval processing unit 34 determines whether or not the single media is a sound (step S69). If the single media is a sound (YES in step S69), the retrieval processing unit 34 outputs, to the similar sound retrieval unit 343, a similar sound retrieval instruction with information regarding single media serving as a search condition. In response to the similar sound retrieval instruction from the retrieval processing unit 34, the similar sound retrieval unit 343 performs a similar sound retrieval process based on the information of the single media included in the similar sound retrieval instruction (step S70). The similar sound retrieval unit 343 stores the retrieval results onto the retrieval result storage unit 36 (step S71). More specifically, the similar sound retrieval unit 343 extracts, from the media information storage unit 35, a single media sound similar to the single media sound serving as the search condition based on the feature value of the single media sound serving as the search condition. The similar sound retrieval unit 343 stores, onto the retrieval result storage unit 36, the retrieval results including the single media ID and similarity thereof for each piece of single media. The similar sound retrieval unit 343 extracts a single media sound having a similarity value with the single media sound serving as the search condition higher than a specific threshold value, or if the pieces of single media are sorted in similarity order, the similar sound retrieval unit 343 extracts a single media sound higher than a specific rank from the top. The process then ends.

If it is determined that the single media specified as the search condition is not a sound NO in step S69), the process ends.

Through the above-described process, the retrieval results are obtained in response to the search condition.

Figure 15:
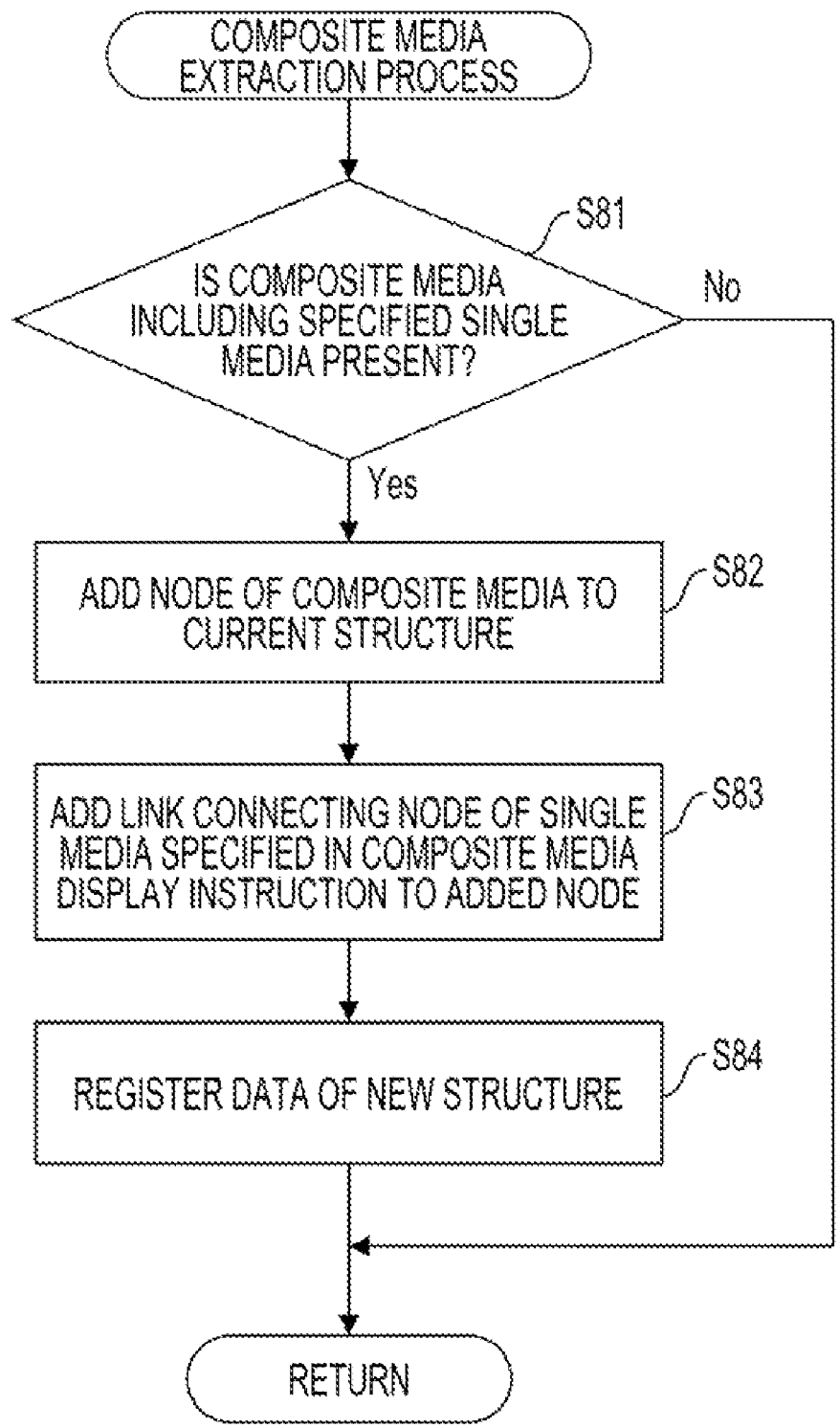
FIG. 15 is a flowchart of a composite media extraction process.

Referring to FIG. 15, the composite media extraction process in step S39 (FIG. 13A) is described. The retrieval controlling unit 321 searches the media information storage unit 35 in response to the ID of the single media included in the composite media display instruction. The retrieval controlling unit 321 determines whether composite media including the single media is present (step S81 in FIG. 15). More specifically, the retrieval controlling unit 321 determines whether the composite media ID corresponding to the single media ID is stored on the media information storage unit 35. If it is determined that the composite media including the single media included in the composite media display instruction is present (YES in step S81), the retrieval controlling unit 321 adds a node of that composite media to the current structural body stored on the retrieval history storage unit 322 (step S82). The retrieval controlling unit 321 adds a link connecting a node of the single media to a node of the added composite media (step S83). The data of the structural body subsequent to the addition is registered as data of a new structural body on the retrieval history storage unit 322 (step S84). The process thus ends.

If it is determined that the composite media including the single media specified by the composite media display instruction is not present (NO in step S81), the process ends.

Through the above-described process, the node of the composite media including the single media specified by the composite media display instruction is displayed.

Figure 16:
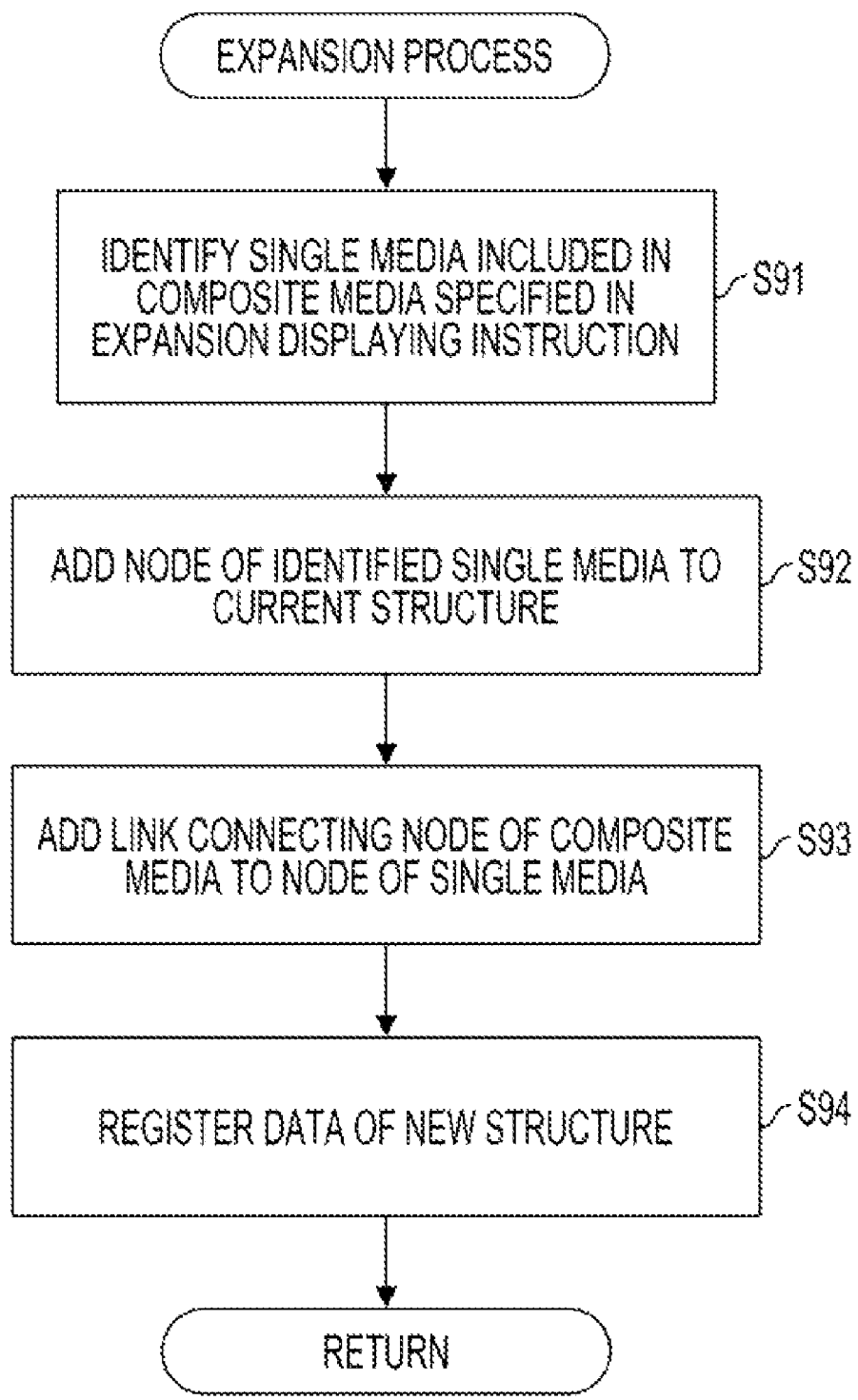
FIG. 16 is a flowchart of an expansion process.

Referring to FIG. 16, the expansion process in step S41 (FIG. 13A) is described below. The retrieval controlling unit 321 searches the media information storage unit 35 based on the composite media ID included in the expansion display instruction. The retrieval controlling unit 321 identifies the single media included in the composite media (step S91 in FIG. 16).

The retrieval controlling unit 321 adds a node of the identified single media to the current structural body stored on the retrieval history storage unit 322 (step S92). The retrieval controlling unit 321 adds a link connecting a node of the composite media to the added node (step S93). Data of the structural body subsequent to the addition is registered on the retrieval history storage unit 322 as data of a new structural body (step S94). The process thus ends. The data of the updated structural body is displayed in step S131 in FIG. 18. If the retrieval operation is performed again with the single media in the composite media used as a new search condition, the origin of the single media may be easily grasped.

Through the above-described process, the node of the single media included in the composite media specified by the expansion display instruction is displayed. More specifically, the above-described process visualizes the inclusion relationship between the composite media and the single media included in the composite media.

Figure 17A:
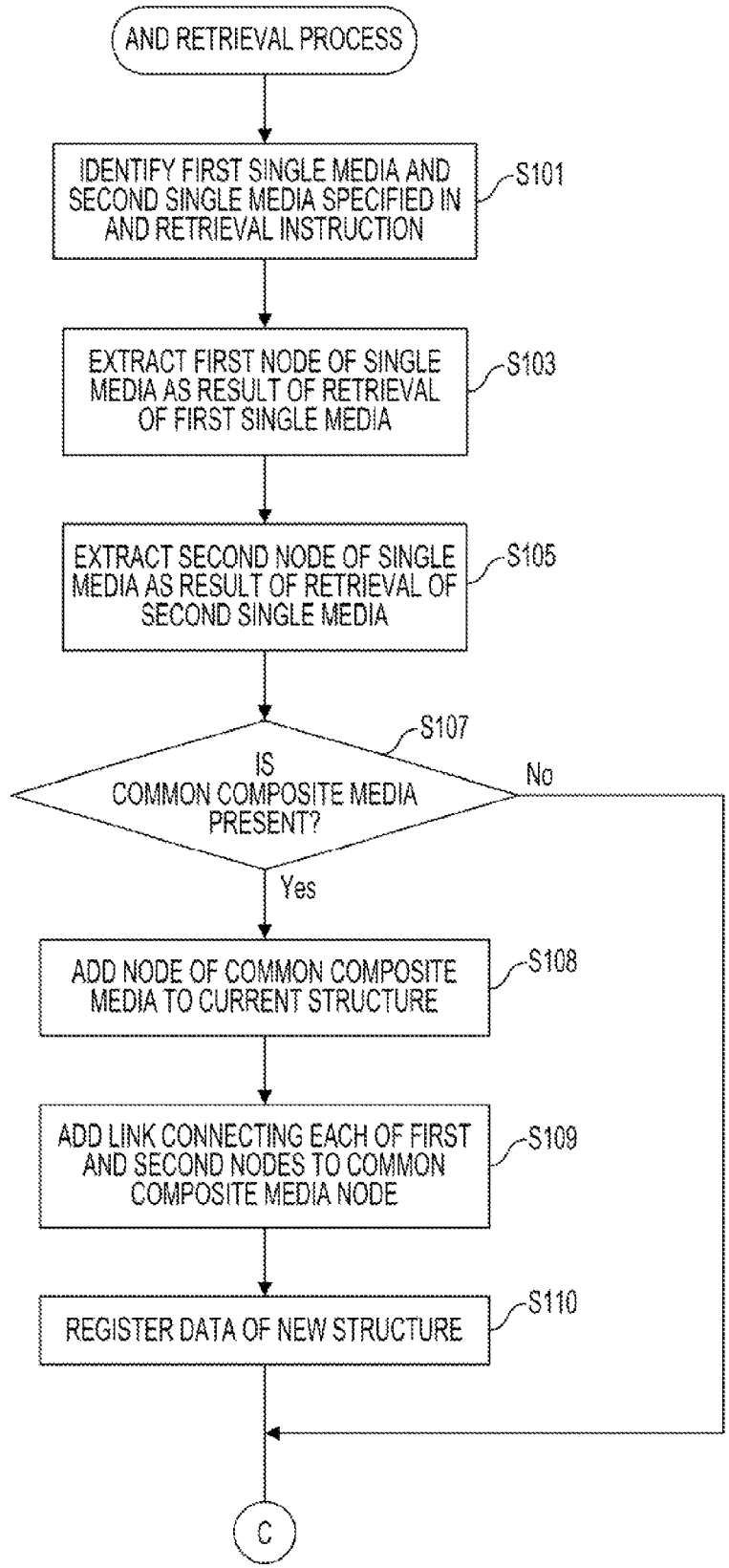
FIG. 17A is a flowchart of an AND retrieval process and FIG. 17B is a continuation of the flowchart of FIG. 17A.

The AND retrieval process in step S46 (FIG. 13A) is described below with reference to FIGS. 17A and 17B. The retrieval controlling unit 321 identifies a first piece of single media and a second piece of single media specified by the AND retrieval instruction (step S101 in FIG. 17A). The retrieval controlling unit 321 identifies a piece of single media as a result of the retrieval process of the first piece of single media from the current structural body stored on the retrieval history storage unit 322, and extracts a node of the identified single media as a first node (step S103). The retrieval controlling unit 321 identifies a piece of single media as a result of the retrieval process of the second piece of single media from the current structural body, and extracts a node of the identified single media as a second node (step S105).

The retrieval controlling unit 321 determines whether or not a common composite media is present (step S107). The common composite media includes the single media related to the first node and the single media related to the second node. If it is determined that a common composite media is present (YES in step 107), the retrieval controlling unit 321 adds a node of the common composite media to the current structural body stored on the retrieval history storage unit 322 (step S108). The retrieval controlling unit 321 adds a link connecting the first node to the node of the common composite media and a link connecting the second node to the node of the common composite media (step S109). The retrieval controlling unit 321 registers the data of the new structural body on the retrieval history storage unit 322 (step S110). Processing proceeds to step S111 (FIG. 17B) via the entry point C.

If it is determined that no common composite media is present (NO in step S107), processing proceeds to step S111 (FIG. 17B) via the entry point C.

Figure 17B:
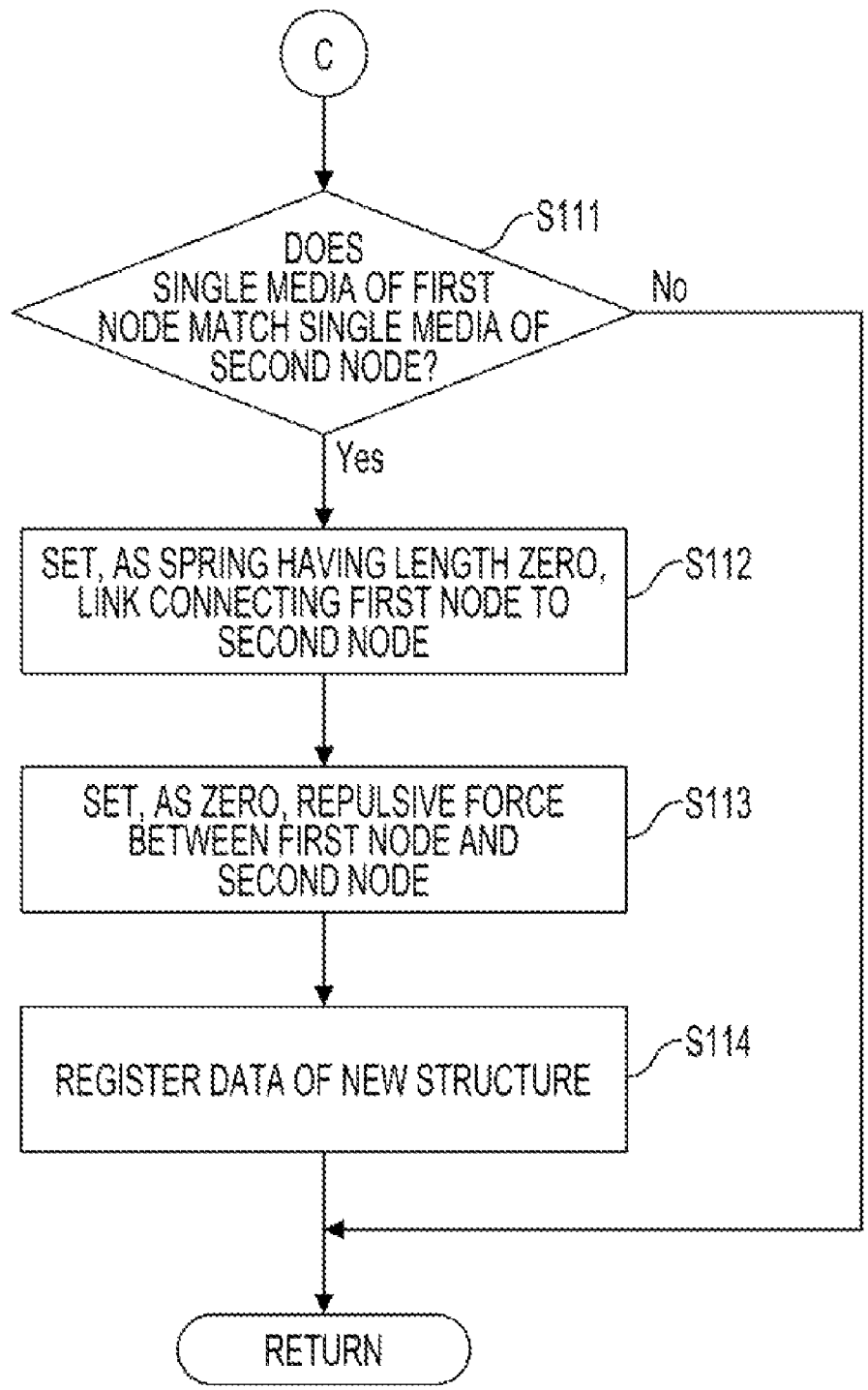

As illustrated in FIG. 17B, the retrieval controlling unit 321 determines whether or not the single media related to the first node matches the single media related to the second node (step S111). More specifically, the retrieval controlling unit 321 searches the media information storage unit 35 to determine whether the single media IDs are similar to each other or not. If it is determined that the single media related to the first node matches the single media related to the second node (YES in step S111), the retrieval controlling unit 321 sets, as a spring having a length of zero, the link connecting the first node to the second node (step S112). The retrieval controlling unit 321 also sets a repulsive force between the first node and the second node to be zero (step S113). The data of the new structural body generated described above is registered on the retrieval history storage unit 322 (step S114). Processing thus ends. The spring is further discussed later. Since the length of the spring connecting the first node to the second node is zero, the two nodes are displayed as a single node when the first and second nodes are displayed in animation.

If it is determined that the single media related to the first node does not match the single media related to the second node (NO in step S111), processing ends.

Figure 18:
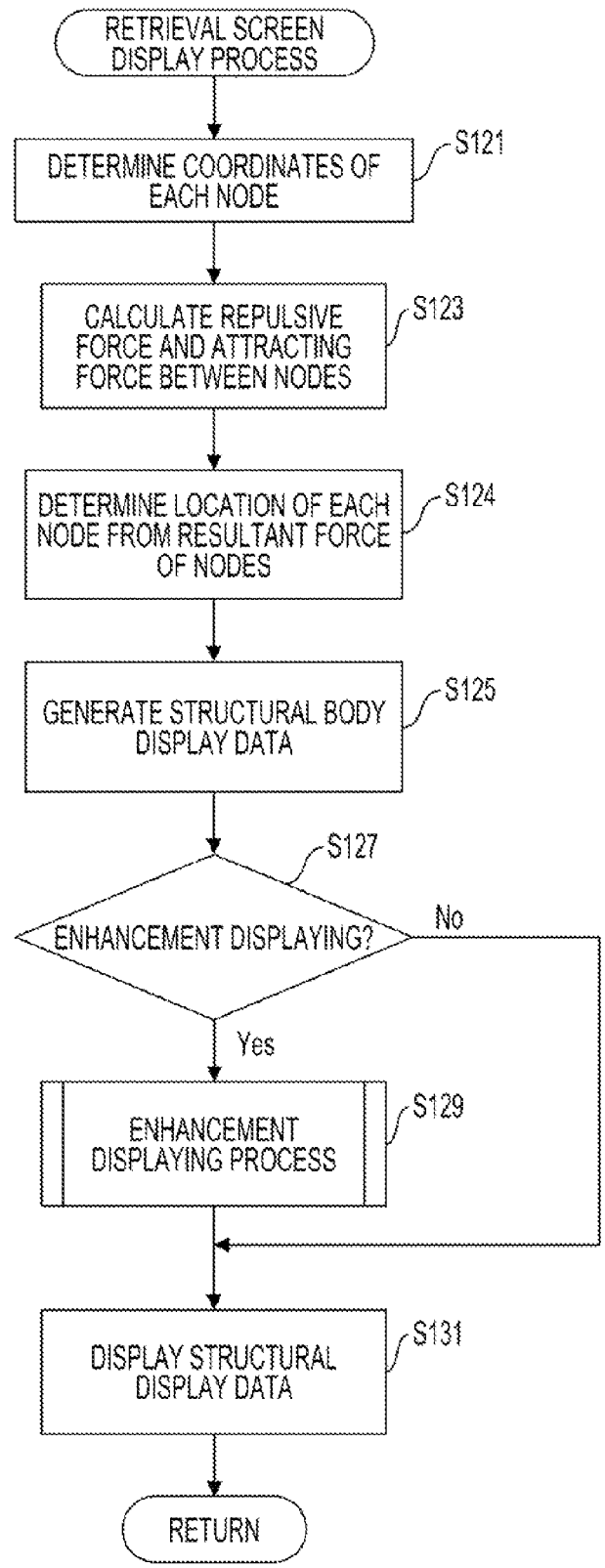
FIG. 18 is a flowchart of a retrieval screen display process.

Through the above-described process, the multimedia integrated retrieval apparatus 3 displays, in step S131 in FIG. 18, the common composite media including the single media as a result of the retrieval process of the first single media and the single media as a result of the retrieval process of the second single media. The user may easily grasp the connection between the retrieval results. In step S131 of FIG. 18, the multimedia integrated retrieval apparatus 3 displays the nodes so that the two nodes gradually approach each other if the single media as a result of the retrieval process of the first single media is very similar or identical to the single media as a result of the retrieval process of the second single media. In comparison with the case in which the two nodes are immediately displayed as one node in an overlay fashion, the user may grasp more easily the relationship of the two nodes. With a spring having a length of zero connecting the nodes in a specific spring model, the multimedia integrated retrieval apparatus 3 may display the nodes that gradually approach each other in a video in step S131 illustrated in FIG. 18.

Referring to FIG. 18, the retrieval screen display process in step S49 (FIG. 13B) is described. The spring model is used to increase the visibility of the structural body in the embodiment. The above-described known technique is used to generate the spring model.

The display unit 323 identifies coordinates of each node in the structural body to be displayed (step S121 in FIG. 18). The display unit 323 calculates a repulsive force and an attracting force between the nodes (step S123). The display unit 323 calculates a resultant force of the node from the calculated repulsive force and attracting force. The display unit 323 determines coordinates of a location of each node from the resultant force of the node (step S124). The display unit 323 generates display data of the structural body in which each node is located at the coordinates, and then stores the display data on a temporary storage device (step S125). If the single media is an image, a thumbnail of the image may be displayed as a node, and if the single media is a document, an icon of a document file may be displayed as a node.

The display unit 323 determines whether enhancement displaying is to be performed (step S127). Whether or not to perform the enhancement displaying may be preset by the user for example. If it is determined that the enhancement displaying is not to be performed (NO in step S127), processing proceeds to step S131. If it is determined that the enhancement displaying is to be performed (YES in step S127), the display unit 323 performs the enhancement display process (step S129). The enhancement display process is described in detail later. The display unit 323 displays the structural body display data stored on a temporary storage device (step S131). The process thus ends.

Through the above-described process, the multimedia integrated retrieval apparatus 3 displays the nodes with some distance away from each other in step S131 of FIG. 18. The user may view the structural body at a higher visibility. The multimedia integrated retrieval apparatus 3 may flexibly respond to an increase in the number of nodes.

Figure 19:
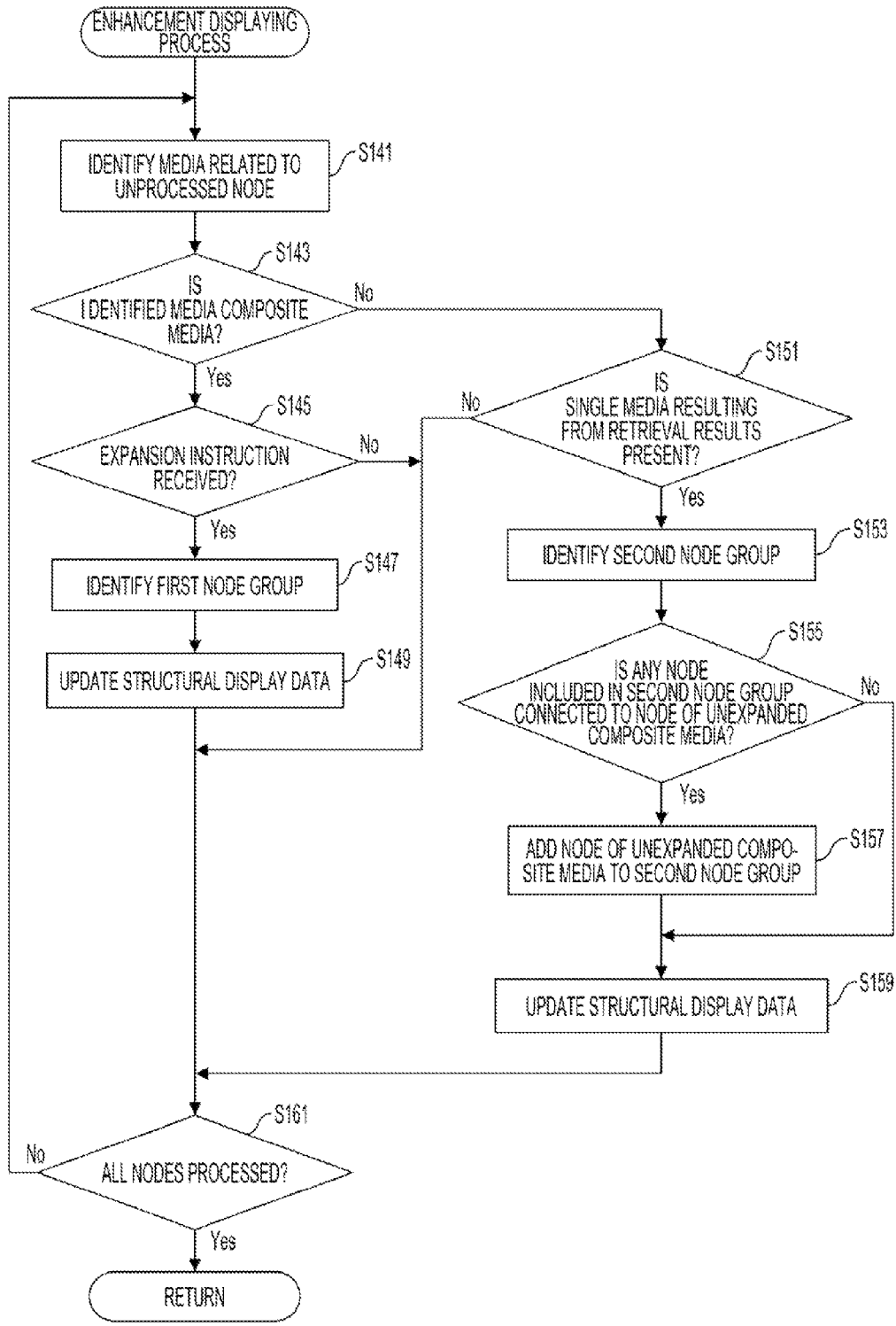
FIG. 19 is a flowchart of an enhancement display process.

The enhancement display process is described with reference to FIG. 19. The display unit 323 identifies an unprocessed node from among the nodes included in the structural body display data. The display unit 323 identifies media of the unprocessed node (step S141 in FIG. 19). The display unit 323 determines whether the identified media is composite media or not (step S143). If it is determined that the unprocessed media is composite media (YES in step S143), the display unit 323 determines whether or not an expansion display instruction to display the composite media as the identified media has been received (step S145). If it is determined that the expansion display instruction of the identified media has not been received (NO in step S145), processing proceeds to step S161.

If it is determined that the expansion display instruction of the identified media has been received (YES in step S145), the display unit 323 identifies a first node group including a node of the identified node and a node of a piece of single media included in the identified media (step S147). Since the identified media is composite media, the identified media includes a plurality of pieces of single media. The display unit 323 updates, for example, the structural body display data so that an outline surrounding the first node group is displayed or so that an area surrounded by the outline is enhanced with a first color (step S149). For example, the outline surrounding the first node group may be drawn using a Bezier curve. Processing proceeds to step S161.

If it is determined in step S143 that the identified media is not composite media (NO in step S143), e.g., that the identified media is a single media, processing proceeds to step S151. In step S151, the display unit 323 determines whether or not single media is present as a result of the retrieval process with the identified media serving as a search condition. If it is determined that single media is not present as a result of the retrieval process (NO in step S151), processing proceeds to step S161.

If it is determined that single media is present as a result of the retrieval process (YES in step S151), the display unit 323 identifies a second node group including a node of the identified node and a node of the single media as a result of the retrieval process (step S153). The display unit 323 determines whether any node included in the second node group is connected to a node of unexpanded composite media (step S155). If it is determined that a node included in the second node group is connected to a node of the unexpanded composite media (YES in step S155), the display unit 323 adds the node of the unexpanded composite media to the second node group (step S157). If it is determined that a node included in the second node group is not connected to a node of the unexpanded composite media (NO in step S155), processing proceeds to step S159.

The display unit 323 updates, for example, the structural body display data so that the second node group is surrounded by an outline or so that an area surrounded by the outline is enhanced with the second color (step S159). For example, the outline surrounding the second node group may be drawn using the Bezier curve. Processing proceeds to step S161.

The display unit 323 determines whether all the nodes included the structural body display data have been processed (step S161). If all the nodes included in the structural body display data have not been processed (NO in step S161), processing returns to step S141. If all the nodes included in the structural body display data have been processed (YES in step S161), processing ends.

Through the above-described process, the user may more easily grasp the correspondence relationship between the single media serving as the search condition and the single media extracted as a result of the retrieval process, and the inclusion relationship between the single media and the composite media including the single media.

Figure 20A:
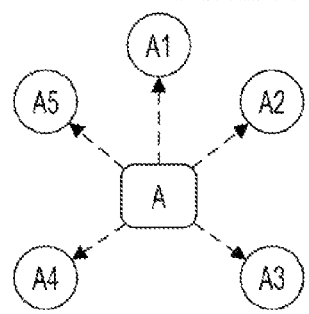
FIGS. 20A-20C illustrate a first screen transition process of an embodiment.

FIGS. 20A-20C through 26 illustrate screen transition examples and enhancement display screen examples in accordance with the embodiment. FIGS. 20A-20C and 21 illustrate the screen transition examples corresponding to the retrieval instruction, the composite media display instruction, and the expansion display instruction. The user may input composite media as a search condition and input an expansion display instruction for the composite media. The multimedia integrated retrieval apparatus 3 having received the expansion display instruction displays a screen of FIG. 20A. Referring to FIG. 20A, the multimedia integrated retrieval apparatus 3 displays a node of a composite media A and nodes of pieces of single media A1-A5 included in the composite media A.

Figure 20B:
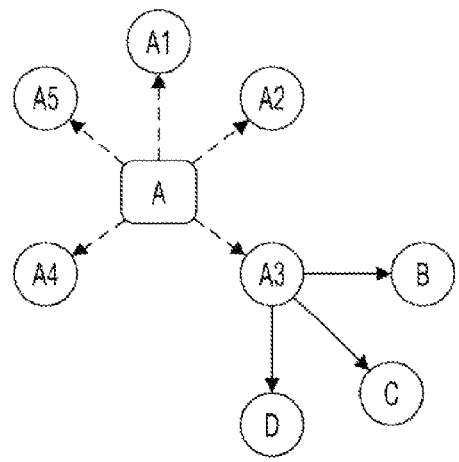

The user may enter the retrieval instruction of the piece of single media A3 on the screen of FIG. 20A. The multimedia integrated retrieval apparatus 3 having received the retrieval instruction displays a screen of FIG. 20B. Referring to FIG. 20B, nodes of pieces of single media B, single media C, and single media D, extracted as a result of the retrieval process to the single media A3, are added on the screen of FIG. 20A.

Figure 20C:
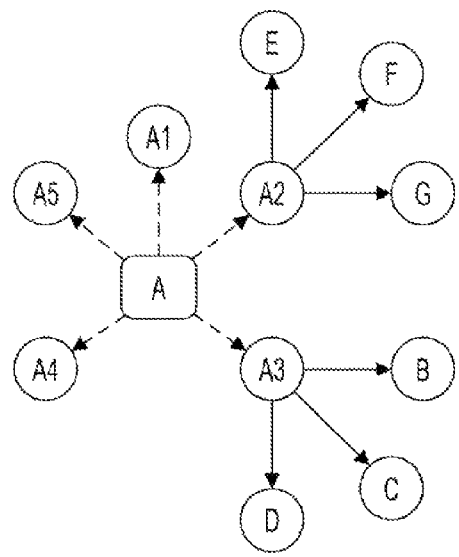

The user may enter the retrieval instruction for the single media A2 on the screen of FIG. 20B. The multimedia integrated retrieval apparatus 3 having receiving a new retrieval instruction displays a screen of FIG. 20C. A piece of single media E, a piece of single media F, and a piece of single media G are extracted as retrieval results. Referring to FIG. 20C, nodes of the pieces of the single media E, the single media F, and the single media G are added on the screen of FIG. 20B.

The user may enter the composite media display instruction for the single media G on the screen of FIG. 20C. The multimedia integrated retrieval apparatus 3 having received the composite media display instruction displays a screen of FIG. 21. A node of a composite media X is added on the screen of FIG. 20C.

Figure 22A:
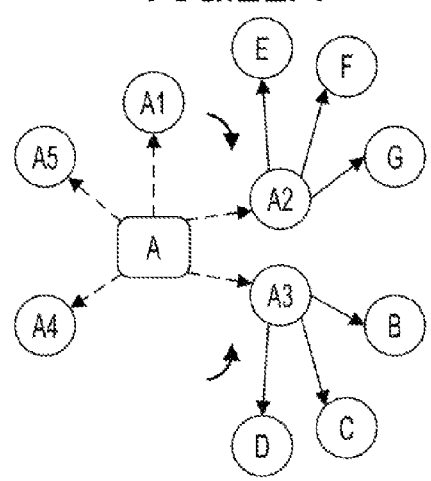
FIGS. 22A-22C illustrate a third screen transition process of an embodiment.
Figure 22B:
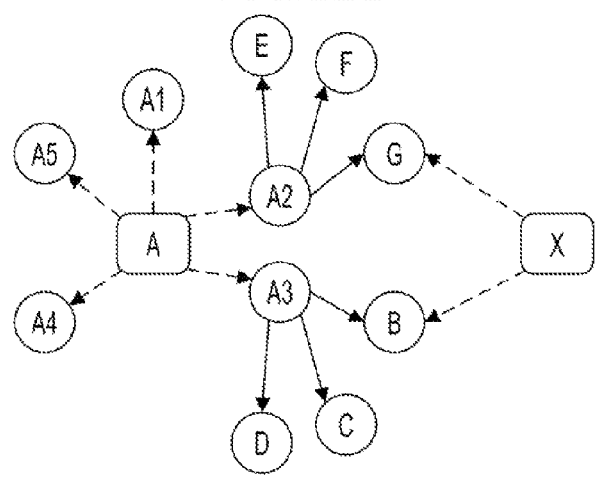
Figure 22C:
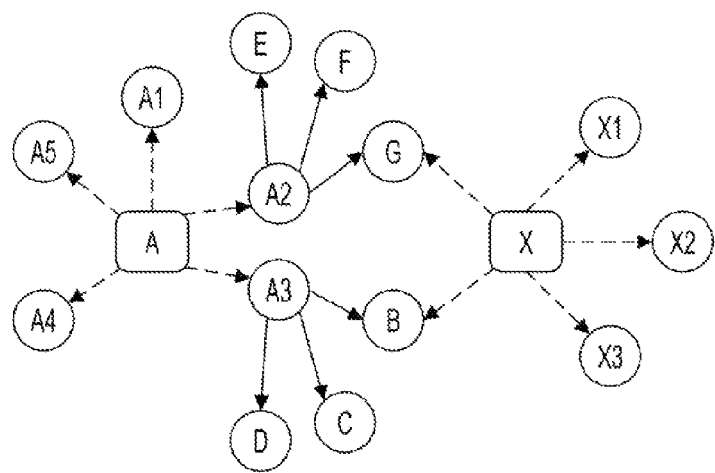

FIGS. 22A-22C illustrate a screen transition example corresponding to the AND retrieval instruction. The user may enter an AND retrieval instruction for single media A2 and A3 on a screen of FIG. 22A. The multimedia integrated retrieval apparatus 3 having received the AND retrieval instruction displays a screen of FIG. 22B. The composite media X includes the single media B and the single media G. Referring to FIG. 22B, the composite media X is added onto the screen of FIG. 22A.

The user may enter an expansion display instruction on the screen of FIG. 22B. The multimedia integrated retrieval apparatus 3 having received the expansion display instruction displays a screen of FIG. 22C. The composite media X here includes, in addition to the single media B and the single media G, single media X1, single media X2, and single media X3. Referring to FIG. 22C, a node of the single media X1, a node of the single media X2, and a node of the single media X3 are added on the screen of FIG. 22B.

Figure 23A:
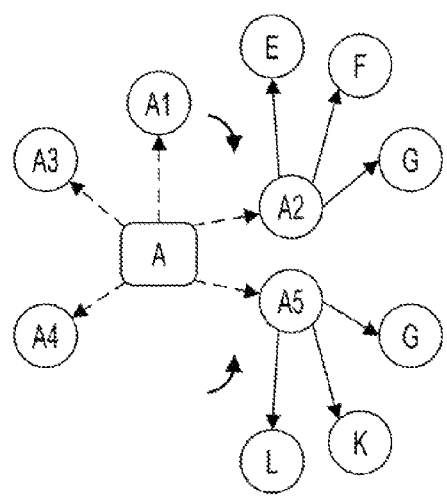
FIGS. 23A-23C illustrate a fourth screen transition process of an embodiment.
Figure 23B:
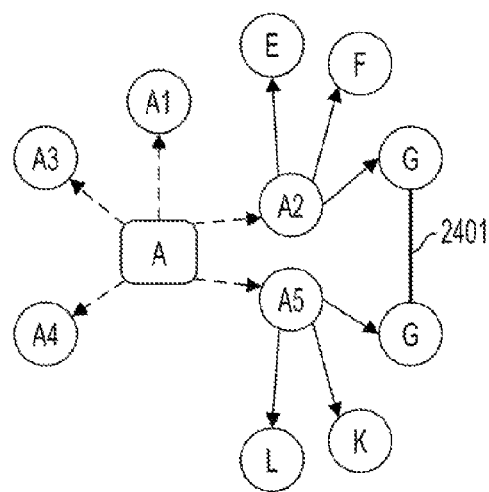

FIGS. 23A and 23B illustrate another screen transition example corresponding to an AND retrieval instruction. The user may enter an AND retrieval instruction for single media A2 and A5 on a screen of FIG. 23A. The multimedia integrated retrieval apparatus 3 having received the AND retrieval instruction displays a screen of FIG. 23B. Single media G, single media K, and single media L are here extracted as retrieval results.

Figure 23C:
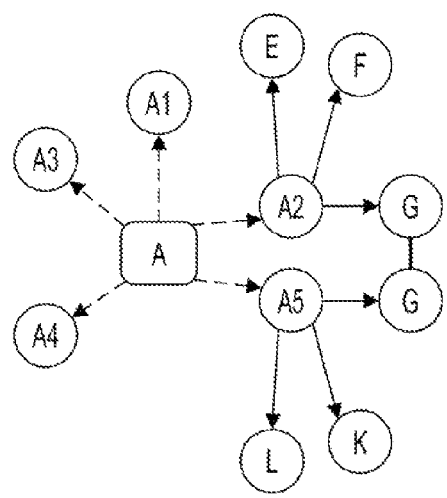
Figure 24A:
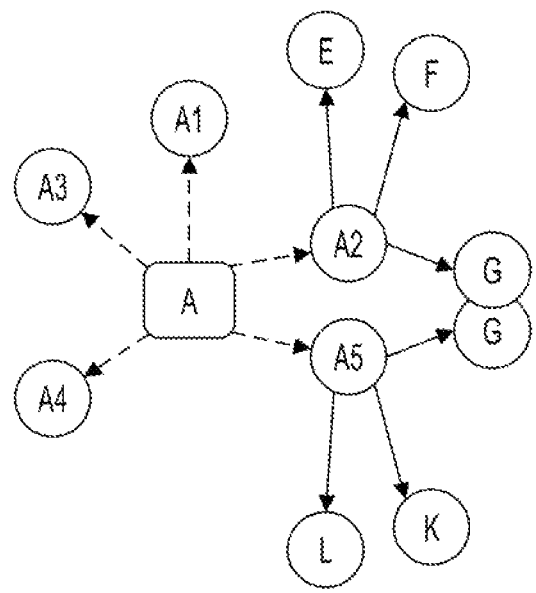
FIGS. 24A and 24B illustrate a fifth screen transition process of an embodiment.

Referring to FIG. 23B, a line 2401 connecting the nodes of the pieces of single media G is added on the screen of FIG. 23A. Since the nodes of the pieces of single media G are connected by a spring having a length of zero, the screen of FIG. 23A is transitioned to screens of FIGS. 23C, 24A, and 24B in that order.

Figure 24B:
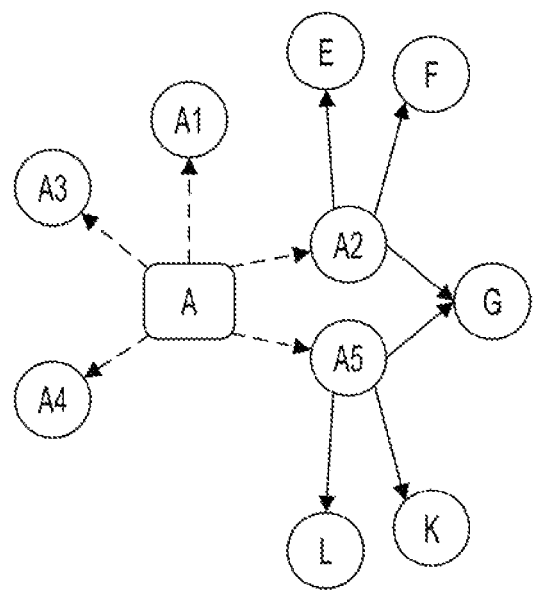

The multimedia integrated retrieval apparatus 3 thus displays in animation how the nodes of the pieces of single media approach each other. Finally as illustrated in FIG. 24B, the nodes of the pieces of single media G are displayed as one node. The pieces of single media G illustrated as one node are separately managed, e.g., one connected to the node of the single media A2 and the other connected to the node of the single media A5 are separately managed.

If the user, for example, double-clicks on the single media A2, the multimedia integrated retrieval apparatus 3 disconnects the spring having a length of zero. Through this operation, the node of the single media G connected to the node of the single media A5 is now displayed as two nodes in the data of the structural body.

Figure 25A:
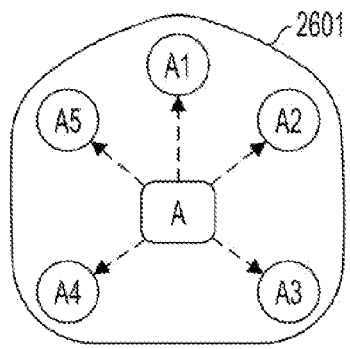
FIGS. 25A-25C illustrate a first enhancement display screen of an embodiment.
Figure 25B:
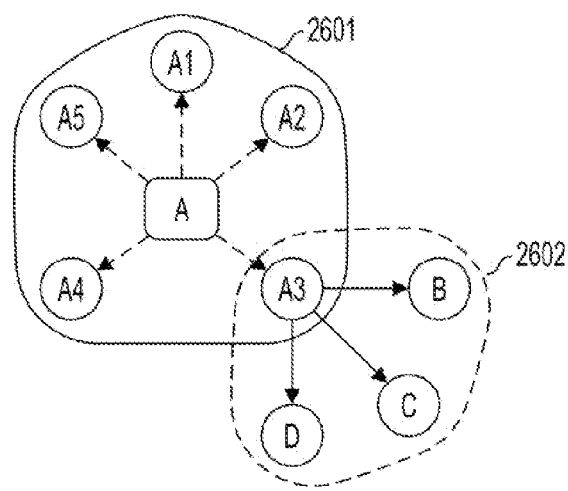
Figure 25C:
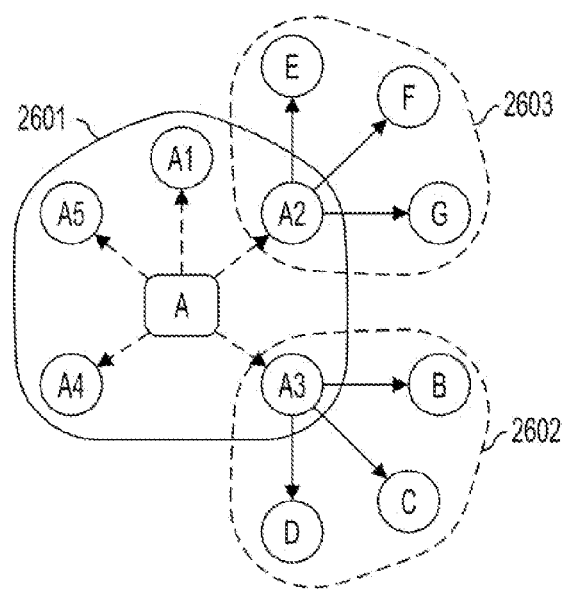

FIGS. 25A-25C through 27A-27C illustrate an enhancement display screen transition example. FIGS. 25A-25C illustrate the enhancement display effect respectively added to the screens of FIGS. 20A-20C. Referring to FIG. 25A, an outline 2601 is added to the screen of FIG. 20A. The outline 2601 is displayed in response to an expansion display instruction for the composite media A input by the user. As illustrated in FIG. 25A, the outline 2601 surrounds the node of the composite media A, and the nodes of pieces of the single media A1-A5 included in the single media A.

Referring to FIG. 25B, an outline 2602 (broken line) is added to the screen of FIG. 25A. The outline 2602 is displayed in response to a retrieval instruction for the single media A3 input by the user. Referring to FIG. 25B, the outline 2602 is displayed to surround the node of the single media A3, and the nodes of the pieces of the single media B, the single media C, and the single media D as retrieval results for the single media A3. Referring to FIG. 25C, an outline 2603 (broken line) is further added on the screen of FIG. 25B. The outline 2603 is displayed in response to a retrieval instruction for the single media A2 input by the user. The outline 2603 is displayed to surround the node of A2 and nodes of the pieces of the single media E, the single media F, and the single media G as retrieval results for the single media A2.

Figure 21:
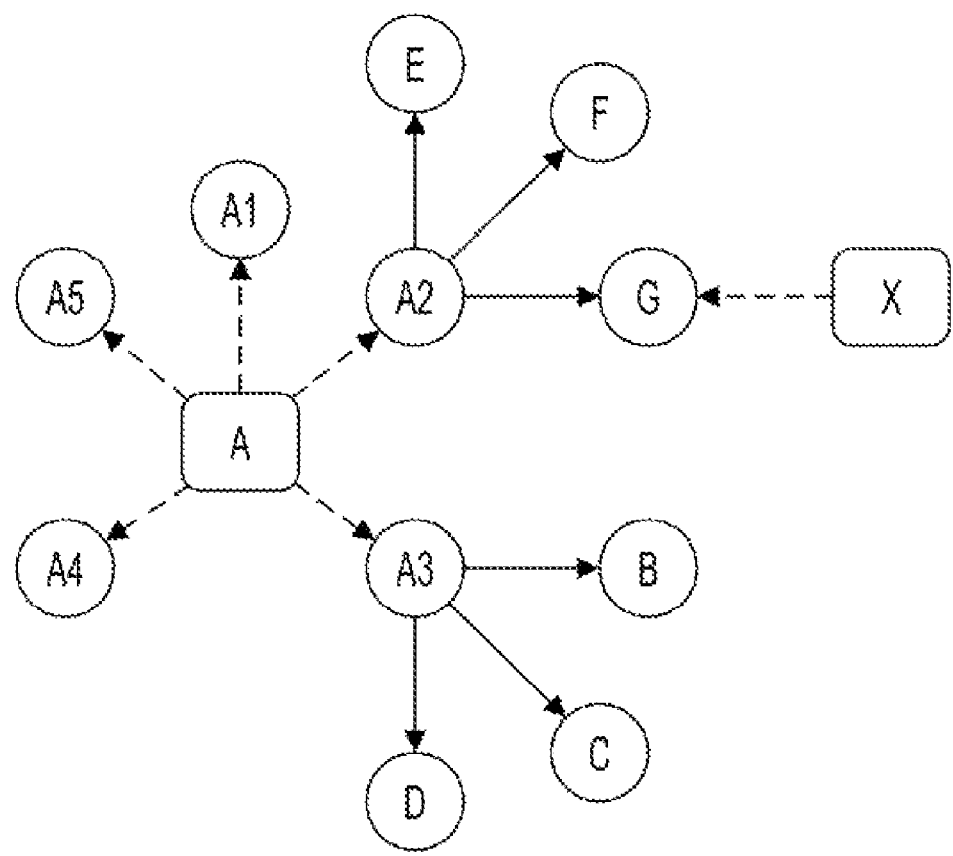
FIG. 21 illustrates a second screen transition process of an embodiment.
Figure 26:
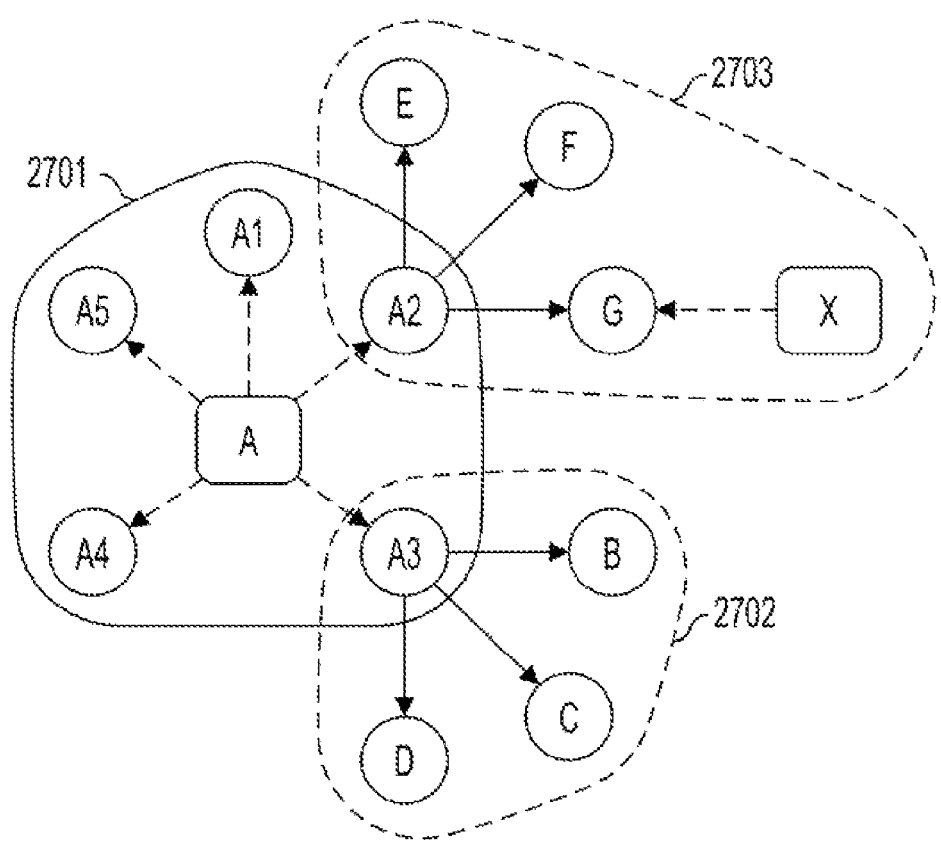
FIG. 26 illustrates a second enhancement display screen of an embodiment.

FIG. 26 illustrates a screen example with the enhancement effect added on the screen of FIG. 21. Referring to FIG. 26, an outline 2701, an outline 2702 (broken line), and an outline 2703 (broken line) are further added on the screen of FIG. 21. Referring to FIG. 26, the outline 2703 is displayed to surround the node of the composite media X in response to a composite media display instruction for the single media G input by the user.

Figure 27A:
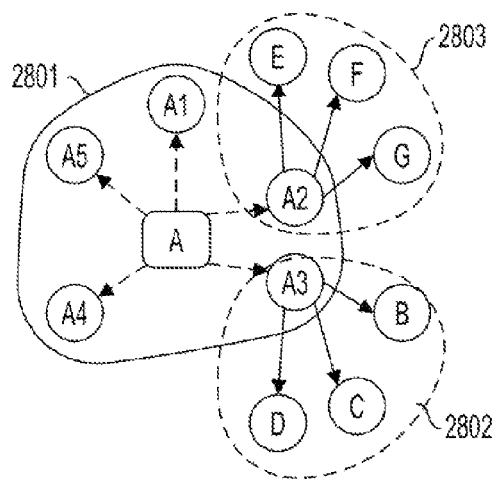
FIGS. 27A-27C illustrate a third enhancement display screen of an embodiment.
Figure 27B:
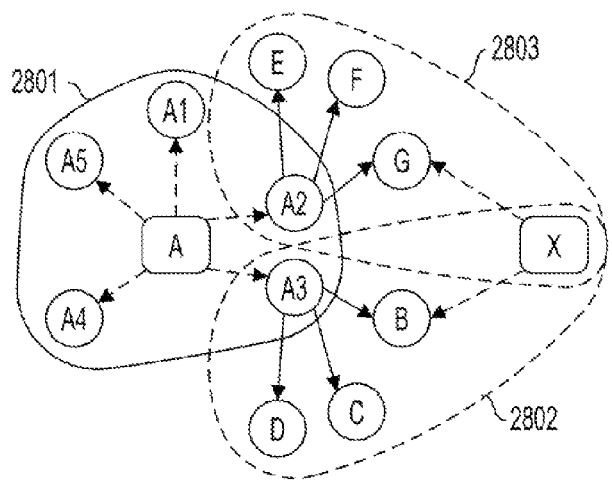
Figure 27C:
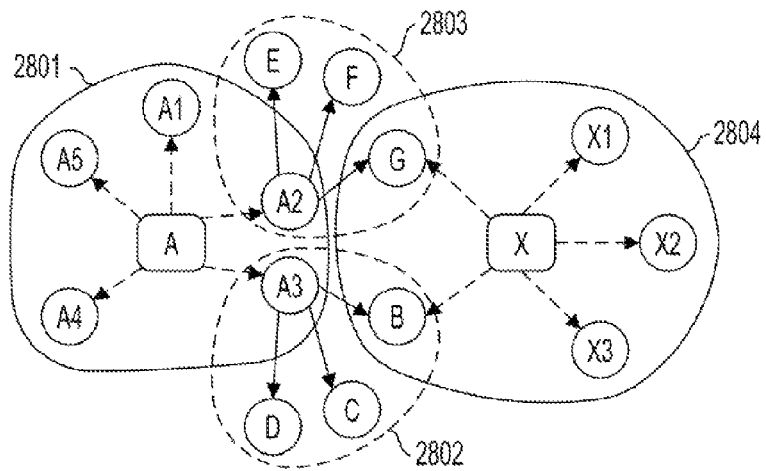

FIGS. 27A-27C illustrate screen examples with the enhancement effect respectively added to the screens of FIGS. 22A-22C. As illustrated in FIG. 27A, an outline 2801, an outline 2802 (broken line), and an outline 2803 (broken line) are further added on the screen of FIG. 22A. As illustrated in FIG. 27B, the outline 2802 and the outline 2803 are respectively displayed to surround the composite media X on the screen of FIG. 27A in response to an AND retrieval instruction for the pieces of single media A2 and A3 input by the user.

Referring to FIG. 27C, an outline 2804 is further added on the screen of FIG. 27B. The outline 2804 is displayed in response to an expansion display instruction for the composite media X input by the user.

As illustrated in FIG. 27C, the outline 2804 is displayed to surround the node of the composite media X, and the nodes of the pieces of the single media B, the single media G, the single media X1, the single media X2, and the single media X3, included in the composite media X. The multimedia integrated retrieval apparatus 3 displays the node of the composite media X outside the outline 2802 and the outline 2803 in response to the expansion display instruction for the composite media X input by the user.

The embodiment of the technique has been discussed. The technique is not limited to the embodiment. For example, the function block diagram of the multimedia integrated retrieval apparatus 3 may not necessarily correspond to an actual program module configuration.

The above-described data structure has been discussed for exemplary purposes only. The data structure is not limited to the one discussed above. The screen examples are illustrated for exemplary purposes only. A different screen structure presenting similar content may be used.

In the above-described process flow, process steps may be changed in order if the process results remain unchanged. The process steps described above may be executed in parallel.

In the above discussion, the multimedia integrated retrieval apparatus 3 waits for a subsequent instruction after a search condition is input. If a piece of single media is input as a search condition, the multimedia integrated retrieval apparatus 3 may perform a retrieval process prior to the reception of a retrieval instruction. If a piece of composite media is input as a research condition, the multimedia integrated retrieval apparatus 3 may perform the expansion display process prior to the reception of an expansion display instruction.

The multimedia integrated retrieval apparatus 3 may be implemented using a hardware structure and a program. Such a program may be stored on a storage medium such as flexible disk, a CD-ROM, an electrooptical disk, a semiconductor memory, a hard disk, or the like, and a storage device. Interim process results may be temporarily stored on a recording device such as a main memory.

Figure 28:
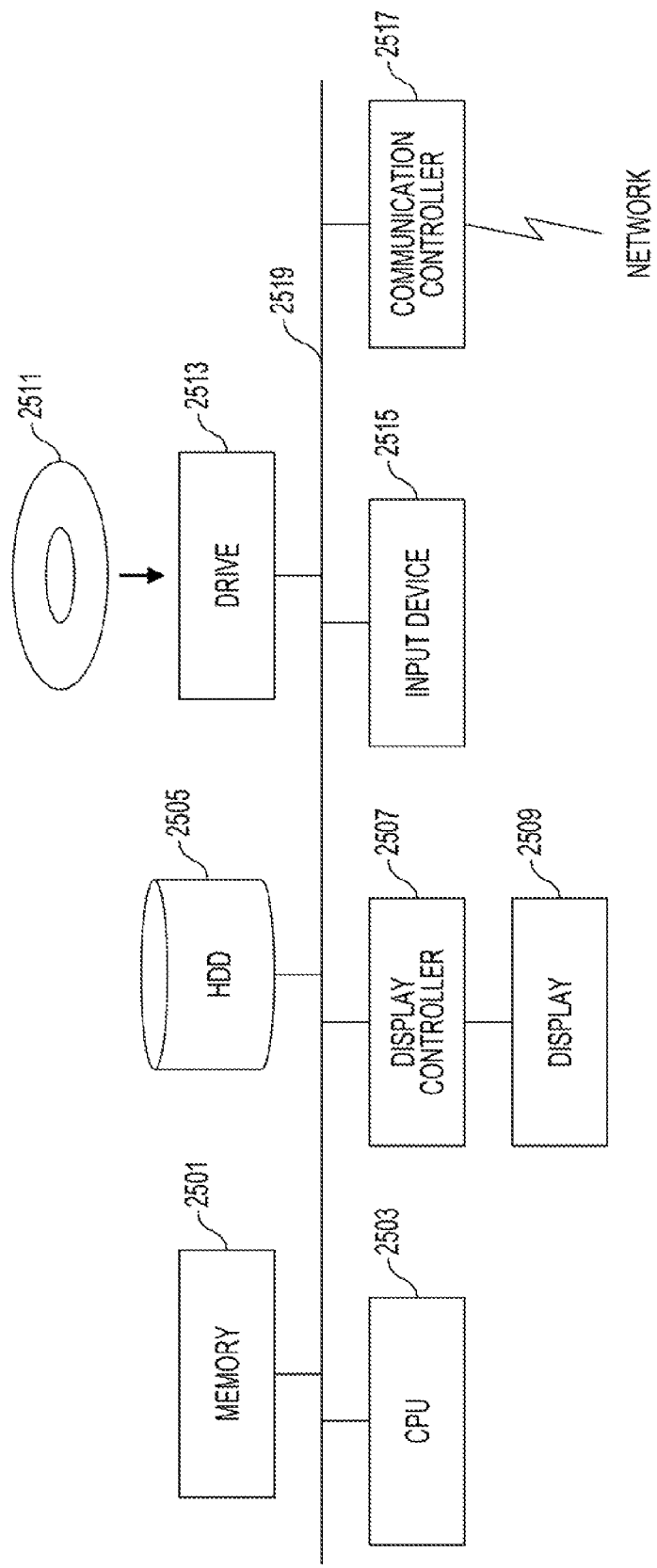
FIG. 28 is a functional block diagram of a computer.

As illustrated in FIG. 28, the multimedia integrated retrieval apparatus 3 includes a memory 2501 (recording unit), a central processing unit (CPU) 2503 (processor), a hard disk drive (HDD) 2505, a display controller 2507 connected to a display 2509, a drive 2513 connected to a removable disk 2511, an input unit 2515, a communication unit 2517 for connection with a network, and a bus 2519 interconnecting these elements. An application program including an operating system (OS), and a Web browser is stored on the HDD 2505. The application program, when being executed by the CPU 2503, is read from the HDD 2505 to the memory 2501. The CPU 2503 controls the display controller 2507, the communication controller 2517, and the drive 2513 as appropriate. Data under process is stored on the memory 2501. The data under process is stored on the HDD 2505, if necessary. The computer performs the variety of processes described above when the hardware structure including the CPU 2503 and the memory 2501, and the OS and the application program cooperate organically.

The invention claimed is:

1. A multimedia integrated retrieval apparatus comprising:
a data gathering unit gathering a plurality of pieces of media data through a network;
a feature value extracting unit calculating a feature value of single media data representing a type of media among the plurality of pieces of media data gathered by the data gathering unit;
a media information storage unit storing the feature value in association with the single media data, and storing composite media data representing a plurality of types of media among the plurality of pieces of media data in association with the single media data included in the composite media data;
a retrieval processing unit referencing the media information storage unit, and identifying other pieces of single media data corresponding to the single media data using the feature value of the single media data based on a retrieval instruction;
a retrieval controlling unit receiving, from a user, the retrieval instruction to retrieve the single media data, generating, in a first generation operation, first structural body data that includes a first node indicative of the single media data, a second node indicative of the another piece of single media data, and a first link connecting the first node to the second node, referencing the media information storage unit to determine whether another piece of composite media data including the another piece of single media data is present, and, if the another piece of composite media data is present, generating, in a second generation operation, second structural body data that includes, with the first structural body data, a third node indicative of the another composite media data, and a second link connecting the third node to the second node; and
a display unit displaying the second structural body data.

2. The multimedia integrated retrieval apparatus according to claim 1, wherein the display unit displays the first structural body data; and
wherein the retrieval controlling unit receives, from the user, a display instruction to display the another piece of composite media data including the another piece of single media data, and generates the second structural body data in the second generation operation in response to the display instruction.

3. The multimedia integrated retrieval apparatus according to claim 1,
wherein the retrieval processing unit receives, from the user, an expansion display instruction to display the other composite media data, and extracts inclusive single media data included in the composite media data from the media information storage unit;
wherein the retrieval controlling unit generates third structural body data, that includes, with the second structural body data, a fourth node indicative of the internal single media data, a fifth node indicative of the composite media data, and a third link connecting the fourth node to the fifth node; and
wherein the display unit displays the third structural body data.

4. A storage medium device storing a multimedia integrated search program that causes a computer to execute:
gathering a plurality of pieces of media data through a network;
calculating a feature value of single media data representing a type of media from among the plurality of pieces of media data gathered in the gathering;
storing the feature value in association with the single media data in a media information storage unit that stores composite media data representing a plurality of types of media among the plurality of pieces of media data, in association with the single media data included in the composite media data;

receiving, from a user, a retrieval instruction to retrieve the single media data;

referencing the media information storage unit, and identifying another piece of single media data corresponding to the single media data using the feature value of the single media data, according to the retrieval instruction;

generating, in a first generation operation, first structural body data that includes a first node indicative of the single media data, a second node indicative of the another piece of single media data, and a first link connecting the first node to the second node;

referencing the media information storage unit and determining whether another piece of composite media data including the another piece of single media data is present;

if the another piece of composite media data is present, generating, in a second generation operation, second structural body data that includes, with the first structural body data, a third node indicative of the another piece of composite media data, and a second link connecting the third node to the second node; and displaying the second structural body data.

5. The storage medium device according to claim 4, wherein a type of single media data includes one of text data, image data, and sound data, and wherein the composite media data includes at least two of the types of single media data.

6. The storage medium device according to claim 4, wherein the multimedia integrated search program causes the computer to further execute:

displaying the first structural body data in succession to the first generation operation; and receiving, from the user, a display instruction to display the another piece of composite media data including the another piece of single media data.

7. The storage medium device according to claim 4, wherein the multimedia integrated search program causes the computer to further execute:

receiving, from the user, an expanded display instruction to expand a display of the composite media data;

extracting included single media data included in the composite media data by referencing the media information storage unit;

generating, in a third generation operation, third structural body data that includes, with the second structural body data, a fourth node indicative of the included single media data, a fifth node indicative of the composite media data, and a third link connecting the fourth node to the fifth node; and displaying the third structural body data.

8. A storage medium device storing a multimedia integrated search program that causes a computer to execute:

gathering a plurality of pieces of media data through a network;

calculating a feature value of single media data representing a type of media from among the plurality of pieces of media data that is gathered;

storing the feature value in association with the single media data in a media information storage unit that stores composite media data representing a plurality of types of media among the plurality of pieces of media data, in association with the single media data included in the composite media data;

receiving, from a user, a retrieval instruction to retrieve first single media data;

referencing the media information storage unit, and identifying, in a first identification operation, second single media data corresponding to the single media data using the feature value of the first single media data corresponding to the retrieval instruction;

receiving, from the user, another retrieval instruction to retrieve third single media data;

referencing the media information storage unit, and identifying, in a second identification operation, fourth single media data corresponding to the third single media data using a feature value of the third single media data corresponding to the another retrieval instruction;

referencing the media information storage unit and determining whether another piece of composite media data including the second single media data and the fourth single media data is present;

generating, if the another piece of composite media data is present, structural body data that includes a node indicative of the second single media data, a node indicative of the fourth single media data, a node indicative of the another piece of composite media data, a link connecting the node indicative of the second single media data to the node indicative of the another piece of composite media data, and a link connecting the node indicative of the fourth single media data to the node indicative of the another piece of composite media data; and displaying the structural body data.

9. The storage medium device according to claim 8, wherein the multimedia integrated search program causes the computer to further execute:

generating, in succession to the second identification operation, other structural body data that includes a node indicative of the first single media data, the node indicative of the second single media data, a first link connecting the node indicative of the first single media data to the node indicative of the second composite media data, a node indicative of the third single media data, the node indicative of the fourth single media data, and a second link connecting the node indicative of the third single media data to the node indicative of the fourth single media data;

displaying the other structural body data; and receiving, in a third reception operation, an AND retrieval instruction to AND retrieve the second single media data and the fourth single media data.

10. The storage medium device according to claim 8, wherein the multimedia integrated search program causes the computer to further execute:

displaying, together with the structural body data, an outline surrounding the node indicative of the first single media data and the node indicative of the second single media data, when displaying the structural body data.

11. The storage medium device according to claim 8, wherein the multimedia integrated search program causes the computer to further execute:

determining whether the second single media data is identical to the fourth single media data;

generating, if the second single media data is determined to be identical to the fourth single media data, in a second generation operation, other structural body data that includes, with the structural body data, a third link connecting the node of the second single media data to the node of the fourth media data; and displaying, in a second displaying operation, the other structural body data.

12. The storage medium device according to claim 11, wherein the multimedia integrated search program causes the computer to further execute:

displaying, in the second displaying operation, the other structural body data as a video that shortens the length of the third link connecting the node of the second single media to the node of the fourth single media with time.

* * * * *